US012780252B2

(12) United States Patent
Ogawa et al.

(10) Patent No.: US 12,780,252 B2
(45) Date of Patent: Nov. 3, 2026

(54) DRIVING ASSISTANCE DEVICE AND COMPUTER PROGRAM

(71) Applicant: AISIN CORPORATION, Kariya (JP)

(72) Inventors: Keita Ogawa, Kariya (JP); Mitsuhiro Nimura, Kariya (JP); Hidenori Nagasaka, Kariya (JP)

(73) Assignee: AISIN CORPORATION, Kariya (JP)

( * ) Notice: Subject to any disclaimer, the term of this patent is extended or adjusted under 35 U.S.C. 154(b) by 9 days.

(21) Appl. No.: 18/875,295

(22) PCT Filed: Jul. 6, 2023

(86) PCT No.: PCT/JP2023/025103
§ 371 (c)(1),
(2) Date: Dec. 16, 2024

(87) PCT Pub. No.: WO2024/048074
PCT Pub. Date: Mar. 7, 2024

(65) Prior Publication Data

US 2026/0021826 A1 Jan. 22, 2026

(30) Foreign Application Priority Data

Aug. 30, 2022 (JP) ................................ 2022-136693

(51) Int. Cl.
*B60W 60/00* (2020.01)

(52) U.S. Cl.
CPC .... *B60W 60/0011* (2020.02); *B60W 60/0021* (2020.02); *B60W 2552/20* (2020.02); *B60W 2556/40* (2020.02)

(58) Field of Classification Search
None
See application file for complete search history.

(56) References Cited

U.S. PATENT DOCUMENTS 10,796,576 B2 * 10/2020 Matsunaga ........... G01S 7/4026
12,103,555 B2 * 10/2024 Nasu .................. B60W 60/001

(Continued)

FOREIGN PATENT DOCUMENTS

CN 110806218 A * 2/2020 ......... G01C 21/3446
JP 2019105578 A * 6/2019

(Continued)

OTHER PUBLICATIONS

International Search Report for PCT/JP2023/025103 dated Sep. 26, 2023.

(Continued)

*Primary Examiner* — Hunter B Lonsberry
*Assistant Examiner* — Robert L Pinkerton
(74) *Attorney, Agent, or Firm* — Sughrue Mion, PLLC

(57) ABSTRACT

Provided is a driving assistance device and a computer program to generate a travel path suppressing a steep turn or sudden deceleration upon traveling on a curved section or consecutive curves, as a travel path recommended for vehicle travel. Specifically, a planned travel route along which a vehicle travels is obtained; particularly, when the obtained planned travel route includes a plurality of consecutive curves, a coupling point for the plurality of curves is set, using map information including information about markings and targeting a curved section including the plurality of curves; a first-half travel path that reaches the coupling point from a start vector and a second-half travel path that reaches an end vector from the coupling point are combined together, targeting the curved section, to generate a recommended travel path for a vehicle; and driving assistance for the vehicle is provided based on the generated travel path.

7 Claims, 18 Drawing Sheets

(56) References Cited

U.S. PATENT DOCUMENTS

| | | | | |
|---|---|---|---|---|
| 2019/0184979 | A1* | 6/2019 | Yamamoto | B60W 30/18145 |
| 2019/0308621 | A1* | 10/2019 | Inou | B60W 30/095 |
| 2021/0291860 | A1* | 9/2021 | Kondo | B60W 60/0053 |
| 2022/0234577 | A1* | 7/2022 | Baba | B60W 30/09 |
| 2022/0258763 | A1 | 8/2022 | Nimura | |
| 2023/0192074 | A1* | 6/2023 | Abad | B60W 60/0053 701/26 |

FOREIGN PATENT DOCUMENTS

| | | | |
|---|---|---|---|
| JP | 2021-169234 | A | 10/2021 |
| WO | 2021059601 | A1 | 4/2021 |

OTHER PUBLICATIONS

Written Opinion for PCT/JP2023/025103 dated Sep. 26, 2023.
Extended European Search Report dated Aug. 12, 2025, issued in European application No. 23859844.5.

* cited by examiner

DRIVING ASSISTANCE DEVICE AND COMPUTER PROGRAM

CROSS REFERENCE TO RELATED APPLICATIONS

This application is a National Stage of International Application No. PCT/JP2023/025103 filed Jul. 6, 2023, claiming priority based on Japanese Patent Application No. 2022-136693 filed Aug. 30, 2022, the entire contents of which are incorporated in their entirety.

TECHNICAL FIELD

The present disclosure relates to a driving assistance device and a computer program that provide assistance in driving a vehicle in a parking lot.

BACKGROUND ART

In recent years, as a vehicle's travel mode, there has been newly proposed an autonomous driving assistance system that aids a user in driving a vehicle by allowing a vehicle side to perform some or all of user's driving operations, in addition to manual travel in which the vehicle travels based on user's driving operations. The autonomous driving assistance system, for example, detects a current location of the vehicle, a lane in which the vehicle travels, and the locations of other vehicles around the vehicle whenever necessary, and autonomously performs control of the vehicle such as steering, a drive source, and a brake such that the vehicle travels along a preset route.

In addition, when travel by the above-described autonomous driving assistance is performed or when various other types of driving assistance for a vehicle are provided, a travel path recommended for the vehicle to travel along is generated in advance on roads on which the vehicle travels, based on a planned travel route of the vehicle, map information, etc. For example, WO 2021/059601 A discloses a technique in which for areas other than within intersections or other than sections in which lane changes are made, a travel path recommended for a vehicle to travel along is generated in the center of a lane in which the vehicle travels, and the vehicle is controlled to travel in accordance with the generated travel path.

CITATIONS LIST

Patent Literature

Patent Literature 1: WO 2021/059601 A (paragraph 0081)

SUMMARY OF THE DISCLOSURE

Technical Problems

Here, in the technique disclosed in the above-described Patent Literature 1, a travel path recommended for the vehicle to travel along is basically generated in the center of a lane in which the vehicle travels, except for some sections such as within intersections. Thus, for sections including a road having a shape that curves at a predetermined angle or a shape that curves at a predetermined curvature in an arc-shaped manner (hereinafter, referred to as curved sections), too, a travel path recommended for the vehicle to travel along has been generated in the center of a lane in which the vehicle travels. However, particularly, for a curved section including a plurality of consecutive curves such as a crank or an S-curve, a path where the vehicle travels in the center of a lane is not always a travel path recommended for the vehicle, and may have possibly been, for example, a path involving a steep turn or sudden deceleration.

The present disclosure is made to solve the above-described conventional problem, and provides a driving assistance device and a computer program that enable generation of a travel path that suppresses a steep turn or sudden deceleration upon traveling on a curved section including a plurality of consecutive curves, as a travel path recommended for a vehicle to travel along, and that enable provision of appropriate driving assistance that does not impose a burden on a vehicle's occupant.

Solutions to Problems

To provide the above-described driving assistance device, a driving assistance device according to the present disclosure includes: planned travel route obtaining means for obtaining a planned travel route along which a vehicle travels; coupling-point setting means for setting, when the planned travel route includes a plurality of consecutive curves, a coupling point for the plurality of curves, targeting a curved section including the plurality of curves; start-vector obtaining means for obtaining a start vector that identifies a position and a direction of a vehicle at a starting point of the curved section for a case of traveling along the planned travel route; end-vector obtaining means for obtaining an end vector that identifies a position and a direction of a vehicle at an end point of the curved section for a case of traveling along the planned travel route; travel path generating means for generating a travel path recommended for a vehicle to travel along, by combining together a first-half travel path and a second-half travel path, targeting the curved section, the first-half travel path reaching the coupling point from the start vector, and the second-half travel path reaching the end vector from the coupling point; and driving assistance means for providing driving assistance for a vehicle, based on the travel path generated by the travel path generating means.

Note that the "curve" includes the shape of a road that curves at a predetermined angle such as a right angle (e.g., an L-junction), in addition to the shape of a road that curves at a predetermined curvature in an arc-shaped manner.

In addition, a computer program according to the present disclosure is a program that generates assistance information used for driving assistance to be provided in a vehicle. Specifically, the computer program causes a computer to function as: planned travel route obtaining means for obtaining a planned travel route along which a vehicle travels; coupling-point setting means for setting, when the planned travel route includes a plurality of consecutive curves, a coupling point for the plurality of curves, targeting a curved section including the plurality of curves; start-vector obtaining means for obtaining a start vector that identifies a position and a direction of a vehicle at a starting point of the curved section for a case of traveling along the planned travel route; end-vector obtaining means for obtaining an end vector that identifies a position and a direction of a vehicle at an end point of the curved section for a case of traveling along the planned travel route; travel path generating means for generating a travel path recommended for a vehicle to travel along, by combining together a first-half travel path and a second-half travel path, targeting the curved section, the first-half travel path reaching the coupling point from the start vector, and the second-half travel path reaching the end vector from the coupling point; and driving assistance means for providing driving assistance for a vehicle, based on the travel path generated by the travel path generating means.

Advantageous Effects of Various Aspects of the Disclosure

According to the driving assistance device and the computer program according to the present disclosure that have the above-described configurations, upon passing through a curved section including a plurality of consecutive curves, a coupling point for the curves is set on a road, based on the geometries of a road and markings, and a travel path is generated where travel paths for the respective curves are coupled together at the coupling point, by which it becomes possible to generate a travel path that suppresses a steep turn or sudden deceleration upon traveling on a curved section including a plurality of consecutive curves, as a travel path recommended for the vehicle to travel along. As a result, it becomes possible to provide appropriate driving assistance that does not impose a burden on a vehicle's occupant.

DESCRIPTION OF EMBODIMENTS

Figure 1:
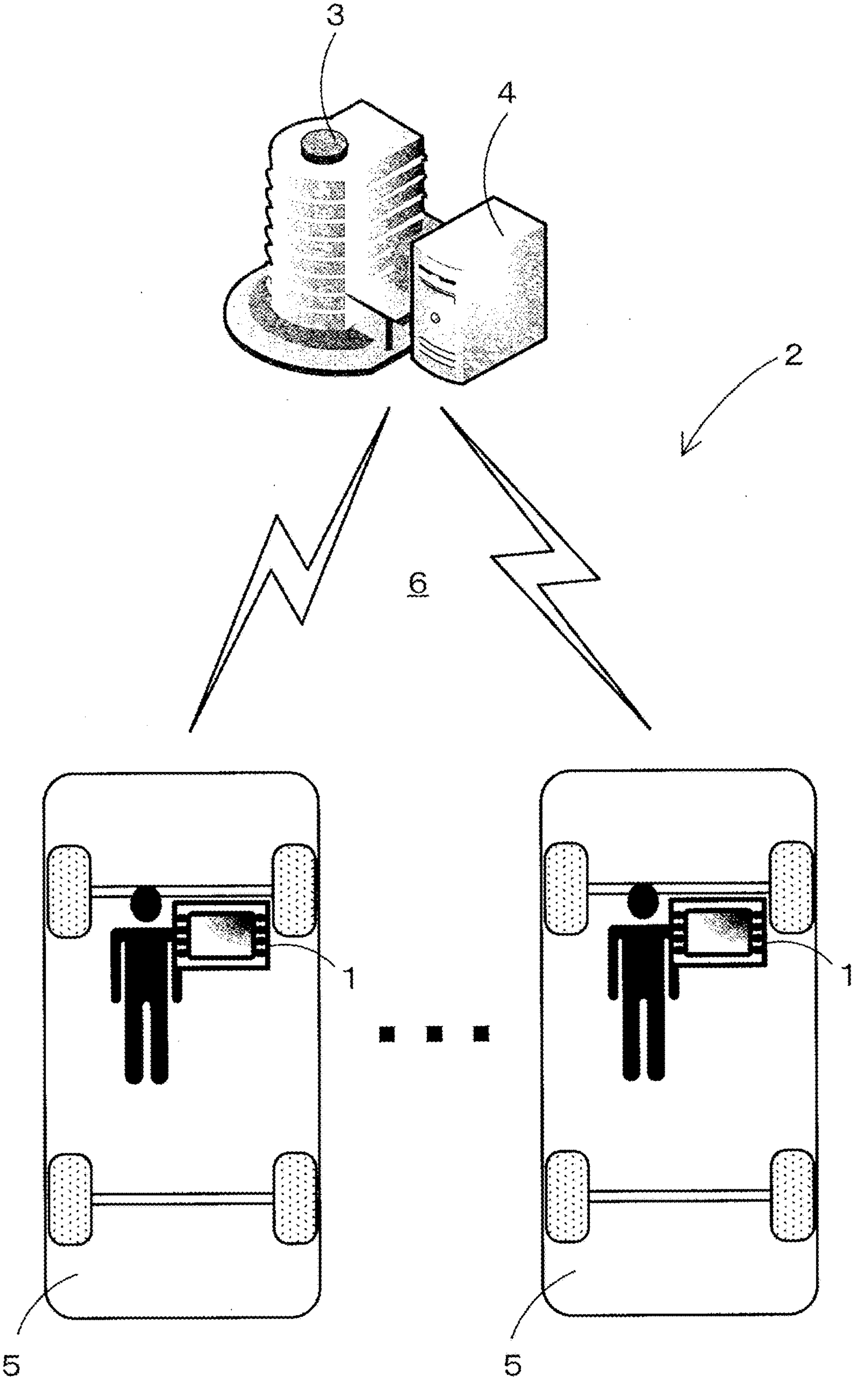
FIG. 1 is a schematic configuration diagram showing a driving assistance system according to the present embodiment.
Figure 2:
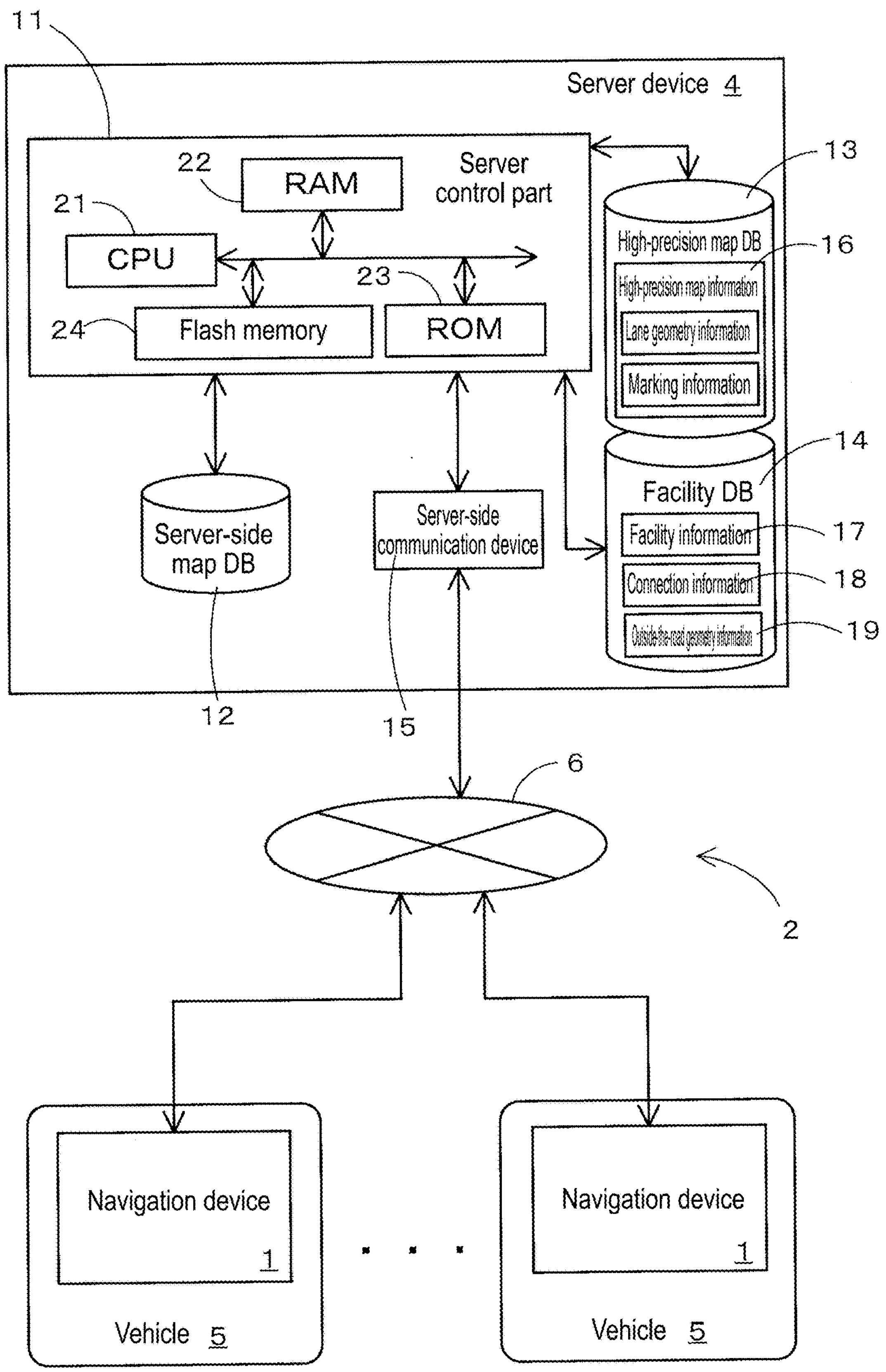
FIG. 2 is a block diagram showing a configuration of the driving assistance system according to the present embodiment.

One embodiment in which a driving assistance device according to the present disclosure is embodied into a navigation device 1 will be described in detail below with reference to the drawings. First, a schematic configuration of a driving assistance system 2 including navigation devices 1 according to the present embodiment will be described using FIGS. 1 and 2. FIG. 1 is a schematic configuration diagram showing the driving assistance system 2 according to the present embodiment. FIG. 2 is a block diagram showing a configuration of the driving assistance system 2 according to the present embodiment.

As shown in FIG. 1, the driving assistance system 2 according to the present embodiment basically includes a server device 4 provided in an information delivery center 3; and navigation devices 1 that are mounted on vehicles 5 to provide various types of assistance in autonomous driving of the vehicles 5. In addition, it is configured such that the server device 4 and the navigation devices 1 can perform transmission and reception of electronic data with each other through a communication network 6. Note that instead of the navigation device 1, any other in-vehicle device mounted on the vehicle 5 or a vehicle control device that performs control on the vehicle 5 may be used.

Here, the vehicle 5 is a vehicle that can perform assistance travel by autonomous driving assistance in which the vehicle autonomously travels along a preset route or along a road independently of user's driving operations, in addition to manual driving travel in which the vehicle travels based on user's driving operations.

In addition, it may be configured such that autonomous driving assistance is provided for all road sections or only while the vehicle travels on specific road sections (e.g., an expressway having a gate at a boundary (it does not matter whether or not there is a person or whether or not a toll is collected)). The following description is made assuming that autonomous driving sections in which autonomous driving assistance for the vehicle is provided include parking lots, in addition to all road sections including general roads and expressways, and that autonomous driving assistance is basically provided during a period from when the vehicle starts traveling until the vehicle finishes traveling (until the vehicle is parked). Note, however, that it is desirable that when the vehicle travels on autonomous driving sections, instead of always providing autonomous driving assistance, autonomous driving assistance be provided only in a situation in which a user has selected provision of autonomous driving assistance (e.g., an autonomous driving start button is turned on) and it is determined to allow the vehicle to travel by autonomous driving assistance. On the other hand, the vehicle 5 may be a vehicle that can only perform assistance travel by autonomous driving assistance.

In vehicle control performed by autonomous driving assistance, for example, a current location of the vehicle, a lane in which the vehicle travels, and locations of obstacles around the vehicle are detected whenever necessary, and control of the vehicle such as steering, a drive source, and a brake is autonomously performed such that the vehicle travels along a travel path generated by the navigation device 1 and at speeds in accordance with a speed plan created likewise, as will be described later. Note that in assistance travel by autonomous driving assistance of the present embodiment, for lane changes, left and right turns, and parking operations, too, the vehicle travels by performing the above-described vehicle control by autonomous driving assistance, but a configuration may be adopted in which special travel such as lane changes, left and right turns, and parking operations is performed by manual driving instead of performing travel by autonomous driving assistance.

Meanwhile, the navigation device 1 is an in-vehicle device mounted on the vehicle 5 to display a map of an area around the location of the vehicle 5 based on map data provided in the navigation device 1 or map data obtained from an external source, or to allow a user to input a destination, or to display a current location of the vehicle on a map image, or to provide guidance on movement along a set guidance route. In the present embodiment, particularly, when the vehicle performs assistance travel by autonomous driving assistance, various types of assistance information about the autonomous driving assistance are generated. The assistance information includes, for example, a travel path recommended for the vehicle to travel along (including a recommended way of moving into lanes), selection of a parking location where the vehicle is parked at a destination, and a speed plan indicating vehicle speeds at which the vehicle travels. Note that details of the navigation device 1 will be described later.

In addition, the server device 4 performs a route search in response to a request from a navigation device 1. Specifically, information required for a route search such as a point of departure and a destination is transmitted together with a route search request from a navigation device 1 to the server device 4 (note, however, that in a case of re-searching, information about a destination does not necessarily need to be transmitted). Then, the server device 4 having received the route search request performs a route search using map information provided in the server device 4, to identify a recommended route from the point of departure to the destination. Thereafter, the identified recommended route is transmitted to the navigation device 1 which is a source of the request. The navigation device 1 can provide a user with information about the received recommended route and can also generate, using the recommended route, various types of assistance information about autonomous driving assistance as will be described later.

Furthermore, the server device 4 has high-precision map information which is map information with higher precision and facility information, separately from normal map information used for the above-described route search. The high-precision map information includes, for example, information about the lane geometries of roads (lane-by-lane road geometries, curvatures, angles of curves, lane widths, etc.) and markings (centerlines, lane lines, edge lines, guidelines, etc.) painted on the roads. In addition to such information, the high-precision map information also includes information about intersections, etc. On the other hand, the facility information is more detailed information about facilities that is stored separately from information about facilities included in the map information. The facility information includes, for example, information about facility floor plans and entrances to parking lots, layout information of passages and parking spaces provided in the parking lots, information on makings that mark off the parking spaces, and connection information indicating a connection relationship between an entrance to a parking lot and a lane. The server device 4 delivers high-precision map information or facility information in response to a request from a navigation device 1, and the navigation device 1 generates, as will be described later, various types of assistance information about autonomous driving assistance, using the high-precision map information or facility information delivered from the server device 4. Note that the high-precision map information is basically map information targeting only a road (link) and an area around the road, but may be map information that also includes an area other than the area around the road.

Note, however, that the above-described route search process does not necessarily need to be performed by the server device 4, and if the navigation device 1 has map information, then the navigation device 1 may perform the route search process. In addition, high-precision map information and facility information may be provided in advance in the navigation device 1, instead of being delivered from the server device 4.

In addition, the communication network 6 includes multiple base stations placed all over the country; and telecommunications companies that manage and control their base stations, and is formed by connecting the base stations to the telecommunications companies by wire (optical fiber, ISDN, etc.) or wirelessly. Here, the base stations each include a transceiver and an antenna that perform communication with navigation devices 1. While the base station performs radio communication with a corresponding telecommunications company, the base station serves as an end of the communication network 6 and plays a role in relaying communication of navigation devices 1 present in an area (cell) where radio waves from the base station reach, to the server device 4.

Next, a configuration of the server device 4 in the driving assistance system 2 will be described in more detail using FIG. 2. The server device 4 includes, as shown in FIG. 2, a server control part 11, a server-side map DB 12 connected to the server control part 11 and serving as information recording means, a high-precision map DB 13, a facility DB 14, and a server-side communication device 15.

The server control part 11 is a control unit (an MCU, an MPU, etc.) that performs overall control of the server device 4, and includes a CPU 21 serving as a computing device and a control device; and internal storage devices such as a RAM 22 used as a working memory when the CPU 21 performs various types of arithmetic processing, a ROM 23 having recorded therein a program for control, etc., and a flash memory 24 that stores a program read from the ROM 23. Note that the server control part 11 has various types of means serving as processing algorithms with an ECU of a navigation device 1 which will be described later.

Meanwhile, the server-side map DB 12 is storage means for storing server-side map information which is the latest version of map information registered based on input data from an external source or based on input operations. Here, the server-side map information includes a road network and various types of information required for a route search, route guidance, and map display. The server-side map information includes, for example, network data including nodes and links that indicate a road network, link data about roads (links), node data about node points, intersection data about each intersection, point data about points such as facilities, map display data for displaying a map, search data for searching for a route, and retrieval data for retrieving a point.

In addition, the high-precision map DB 13 is storage means for storing high-precision map information 16 which is map information with higher precision than the above-described server-side map information. The high-precision map information 16 is, particularly, map information that stores more detailed information about roads on which a vehicle is to travel. In the present embodiment, the high-precision map information 16 includes, for example, for a road, information about lane geometries (lane-by-lane road geometries, curvatures, lane widths, etc.) and markings (centerlines, lane lines, edge lines, guidelines, etc.) painted on the road. Furthermore, the high-precision map information 16 records therein data representing road gradients, cants, banks, merge areas, a location where the number of lanes decreases, a location where the road width becomes narrower, railroad crossings, etc., and records therein: for a curve, data representing the radius of curvature and the angle of the curve; data representing junctions such as intersections and T-junctions; for road attributes, data representing downhill slopes, uphill slopes, etc.; and for the types of road, data representing general roads such as national highways, prefectural highways, and narrow streets, and toll roads such as national expressways, urban expressways, automobile roads, general toll roads, and toll bridges. In addition, as the information about markings, there is stored information that identifies what type of marking is placed on a road in what way. Note that in the following description, it is assumed that the "curve" includes the shape of a road that curves at a predetermined angle such as a right angle (e.g., an L-junction), in addition to the shape of a road that curves at a predetermined curvature in an arc-shaped manner. Note also that in addition to the number of lanes on a road, there is also stored information that identifies a passage segment in a traveling direction for each lane and a connection to a road for each lane (specifically, a correspondence between a lane included in a road before passing through an intersection and a lane included in a road after passing through the intersection). Furthermore, there is also stored speed limits set for roads.

Meanwhile, the facility DB 14 is storage means for storing more detailed information about facilities than information about facilities stored in the above-described server-side map information. Specifically, as facility information 17, there are included, particularly, for a parking lot where a vehicle is to be parked (including both a parking lot belonging to a facility and an independent parking lot), information that identifies the location of an entrance/exit of the parking lot, information that identifies a layout of parking spaces in the parking lot, information about markings that mark off the parking spaces, information about passages, etc. For a facility other than parking lots, there is included information that identifies a floor plan of the facility. The floor plan includes, for example, information that identifies the locations of entrances and exits, passages, stairs, elevators, and escalators. In addition, for a complex commercial facility having a plurality of tenants, there is included information that identifies the location of each tenant that occupies the complex commercial facility. The facility information 17 may be, particularly, information generated by 3D modeling of a parking lot or a facility. Furthermore, the facility DB 14 also includes connection information 18 indicating a connection relationship between a lane included in an entry road facing an entrance to a parking lot and the entrance to the parking lot; and outside-the-road geometry information 19 that identifies a region between the entry road and the entrance to the parking lot, through which a vehicle can pass.

Note that the high-precision map information 16 is basically map information targeting only a road (link) and an area around the road, but may be map information that also includes an area other than the area around the road. In addition, although in the example shown in FIG. 2, the server-side map information stored in the server-side map DB 12 and the information stored in the high-precision map DB 13 and the facility DB 14 are different pieces of map information, the information stored in the high-precision map DB 13 and the facility DB 14 may be a part of the server-side map information. In addition, the high-precision map DB 13 and the facility DB 14 may be a single database instead of being separated from each other.

Meanwhile, the server-side communication device 15 is a communication device for performing communication with the navigation device 1 of each vehicle 5 through the communication network 6. In addition, besides the navigation devices 1, it is also possible to receive traffic information including pieces of information such as traffic congestion information, regulation information, and traffic accident information that are transmitted from an Internet network, traffic information centers, e.g., a VICS (registered trademark: Vehicle Information and Communication System) center, etc.

Figure 3:
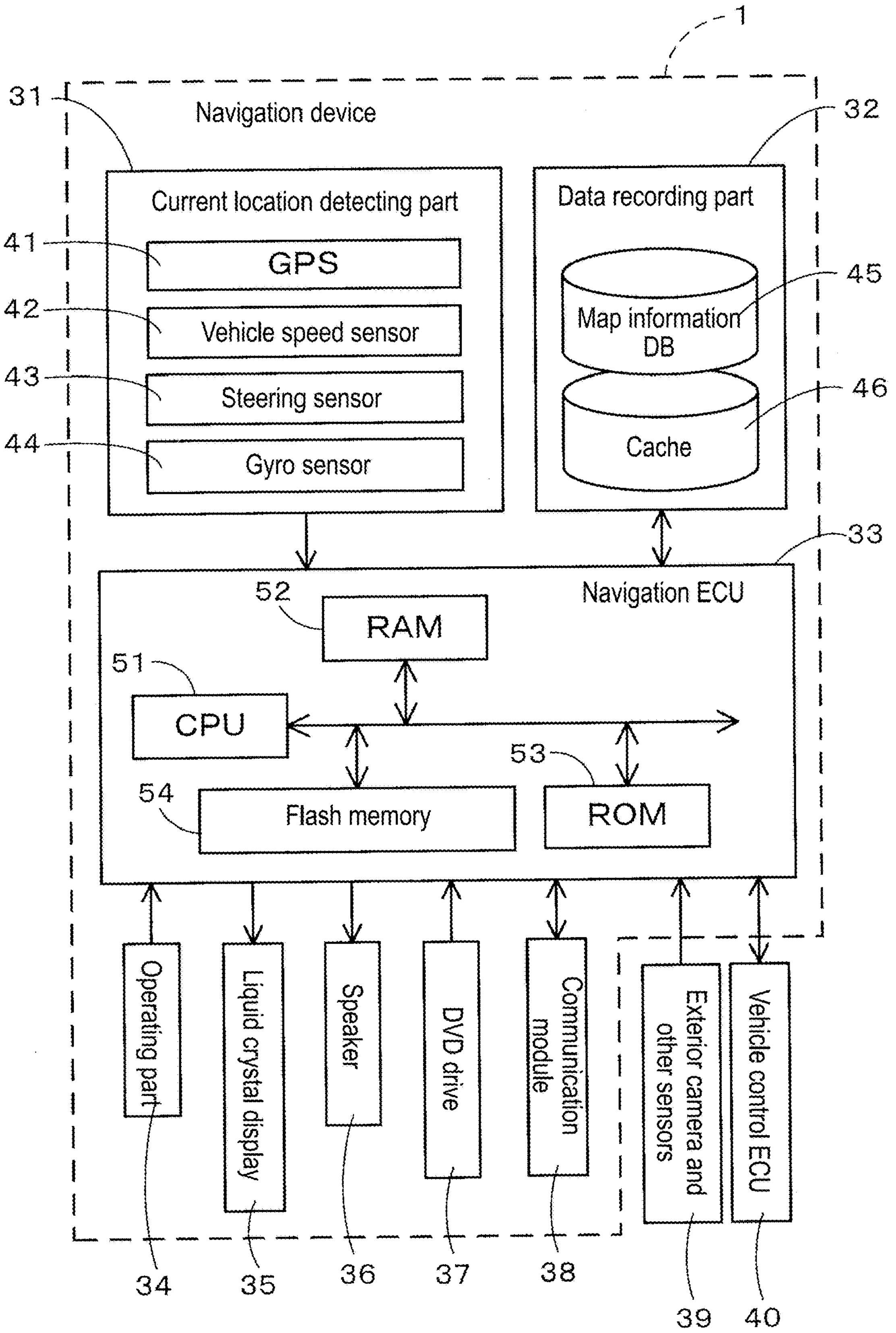
FIG. 3 is a block diagram showing a navigation device according to the present embodiment.

Next, a schematic configuration of the navigation device 1 mounted on the vehicle 5 will be described using FIG. 3. FIG. 3 is a block diagram showing the navigation device 1 according to the present embodiment.

As shown in FIG. 3, the navigation device 1 according to the present embodiment includes a current location detecting part 31 that detects a current location of a vehicle having the navigation device 1 mounted thereon; a data recording part 32 having various types of data recorded therein; a navigation ECU 33 that performs various types of arithmetic processing based on inputted information; an operating part 34 that accepts operations from a user; a liquid crystal display 35 that displays to the user a map of an area around the vehicle, information about a guidance route (a planned travel route of the vehicle) set on the navigation device 1, etc.; a speaker 36 that outputs voice guidance about route guidance; a DVD drive 37 that reads a DVD which is a storage medium; and a communication module 38 that performs communication with information centers such as a probe center and a VICS center. In addition, an exterior camera 39 and various types of sensors that are installed on the vehicle having the navigation device 1 mounted thereon are connected to the navigation device 1 through an in-vehicle network such as a CAN. Furthermore, the navigation device 1 is also connected to a vehicle control ECU 40 that performs various types of control on the vehicle having the navigation device 1 mounted thereon, such that the navigation device 1 and the vehicle control ECU 40 can perform two-way communication.

The components included in the navigation device 1 will be described one by one below.

The current location detecting part 31 includes a GPS 41, a vehicle speed sensor 42, a steering sensor 43, a gyro sensor 44, etc., and can detect the current location and orientation of the vehicle, a vehicle's travel speed, a current time, etc. Here, particularly, the vehicle speed sensor 42 is a sensor for detecting a vehicle's moving distance and vehicle speed, and generates pulses according to the rotation of vehicle's drive wheels and outputs a pulse signal to the navigation ECU 33. Then, the navigation ECU 33 counts the generated pulses, thereby calculating the rotational speed of the drive wheels and a moving distance. Note that the navigation device 1 does not need to include all of the above-described four types of sensors, and may be configured to include only one or a plurality of types of sensors among those sensors.

In addition, the data recording part 32 includes a hard disk (not shown) serving as an external storage device and a recording medium; and a recording head (not shown) which is a driver for reading a map information DB 45 recorded on the hard disk, a cache 46, a predetermined program, etc., and for writing predetermined data to the hard disk. Note that the data recording part 32 may include a flash memory, a memory card, or an optical disc such as a CD or a DVD, instead of a hard disk. Note also that, in the present embodiment, as described above, the server device 4 searches for a route to a destination, and thus, the map information DB 45 may be omitted. Even if the map information DB 45 is omitted, it is also possible to obtain map information from the server device 4 as necessary.

Here, the map information DB 45 is storage means having stored therein, for example, link data about roads (links), node data about node points, search data used in processes related to a route search or change, facility data about facilities, map display data for displaying a map, intersection data about each intersection, and retrieval data for retrieving a point.

Meanwhile, the cache 46 is storage means for saving high-precision map information 16, facility information 17, connection information 18, and outside-the-road geometry information 19 that have been delivered from the server device 4 in the past. A saving period can be set as appropriate, and may be, for example, a predetermined period (e.g., one month) after storage or a period until a vehicle's ACC power supply (accessory power supply) is turned off. In addition, after the amount of data stored in the cache 46 has reached an upper limit, the data may be sequentially deleted in order of oldest to newest. The navigation ECU 33 generates various types of assistance information about autonomous driving assistance, using the high-precision map information 16, facility information 17, connection information 18, and outside-the-road geometry information 19 stored in the cache 46. Details will be described later.

Meanwhile, the navigation ECU (electronic control unit) 33 is an electronic control unit that performs overall control of the navigation device 1, and includes a CPU 51 serving as a computing device and a control device; and internal storage devices such as a RAM 52 that is used as a working memory when the CPU 51 performs various types of arithmetic processing and that stores route data obtained when a route has been searched, etc., a ROM 53 having recorded therein a program for control, an autonomous driving assistance program (see FIG. 4) which will be described later, etc., and a flash memory 54 that stores a program read from the ROM 53. Note that the navigation ECU 33 has various types of means serving as processing algorithms. For example, planned travel route obtaining means obtains a planned travel route along which the vehicle travels. Coupling-point setting means sets, when the planned travel route includes a plurality of consecutive curves, a coupling point for the plurality of curves, targeting a curved section including the plurality of curves. Start-vector obtaining means obtains a start vector that identifies the position and direction of the vehicle at a starting point of the curved section for a case of traveling along the planned travel route. End-vector obtaining means obtains an end vector that identifies the position and direction of the vehicle at an end point of the curved section for a case of traveling along the planned travel route. Travel path generating means generates a travel path recommended for the vehicle to travel along, by combining together a first-half travel path that reaches the coupling point from the start vector and a second-half travel path that reaches the end vector from the coupling point, targeting the curved section. Driving assistance means provides driving assistance for the vehicle, based on the travel path generated by the travel path generating means.

The operating part 34 is operated, for example, upon inputting a point of departure which is a travel start point and a destination which is a travel end point, and includes a plurality of operating switches such as various types of keys and buttons (not shown). Based on a switch signal outputted by, for example, depression of a given switch, the navigation ECU 33 performs control to perform a corresponding one of various types of operation. Note that the operating part 34 may include a touch panel provided on the front of the liquid crystal display 35. Note also that the operating part 34 may include a microphone and a voice recognition device.

In addition, on the liquid crystal display 35 there are displayed a map image including roads, traffic information, operation guidance, an operation menu, guidance on keys, information on guidance provided along a guidance route (planned travel route), news, weather forecasts, time, e-mails, TV programs, etc. Note that instead of the liquid crystal display 35, a HUD or an HMD may be used.

In addition, the speaker 36 outputs voice guidance that provides guidance on travel along a guidance route (planned travel route) or guidance on traffic information, based on an instruction from the navigation ECU 33.

In addition, the DVD drive 37 is a drive that can read data recorded on a recording medium such as a DVD or a CD. Based on the read data, for example, music or video is played back or the map information DB 45 is updated. Note that instead of the DVD drive 37, a card slot for performing reading and writing on a memory card may be provided.

In addition, the communication module 38 is a communication device for receiving traffic information, probe information, weather information, etc., that are transmitted from traffic information centers, e.g., a VICS center and a probe center, and corresponds, for example, to a mobile phone or a DCM. In addition, the communication module 38 also includes a vehicle-to-vehicle communication device that performs communication between vehicles and a roadside-device-to-vehicle communication device that performs communication with a roadside device. In addition, the communication module 38 is also used to transmit and receive to/from the server device 4 route information searched by the server device 4, high-precision map information 16, facility information 17, connection information 18, and outside-the-road geometry information 19.

In addition, the exterior camera 39 includes, for example, a camera that uses a solid-state imaging device such as a CCD, and is attached to the upper side of a vehicle's front bumper and is placed such that its optical-axis direction faces downward at a predetermined angle relative to the horizontal. When the vehicle travels on an autonomous driving section, the exterior camera 39 captures an image of an area ahead in a traveling direction of the vehicle. In addition, the navigation ECU 33 performs image processing on the captured image having been captured, thereby detecting markings painted on a road on which the vehicle travels, or obstacles such as other vehicles around the vehicle, and generates various types of assistance information about autonomous driving assistance, based on results of the detection. For example, when an obstacle has been detected, a new travel path where the vehicle travels avoiding or following the obstacle is generated. Note that the exterior camera 39 may be configured to be disposed on the rear or side of the vehicle besides the front. Note also that for means for detecting obstacles, a sensor such as millimeter-wave radar or a laser sensor, vehicle-to-vehicle communication, or roadside-device-to-vehicle communication may be used instead of a camera.

In addition, the vehicle control ECU 40 is an electronic control unit that controls the vehicle having the navigation device 1 mounted thereon. In addition, vehicle's driving parts such as steering, a brake, and an accelerator are connected to the vehicle control ECU 40, and in the present embodiment, particularly, after the vehicle starts autonomous driving assistance, each driving part is controlled, by which autonomous driving assistance for the vehicle is provided. In addition, when an override has been performed by the user during autonomous driving assistance, the fact that the override has been performed is detected.

Here, the navigation ECU 33 transmits, after starting traveling, various types of assistance information about autonomous driving assistance generated by the navigation device 1 to the vehicle control ECU 40 through the CAN. Then, using the received various types of assistance information, the vehicle control ECU 40 provides autonomous driving assistance to be provided after starting traveling. The assistance information includes, for example, a travel path recommended for the vehicle to travel along and a speed plan indicating vehicle speeds at which the vehicle travels.

Figure 4:
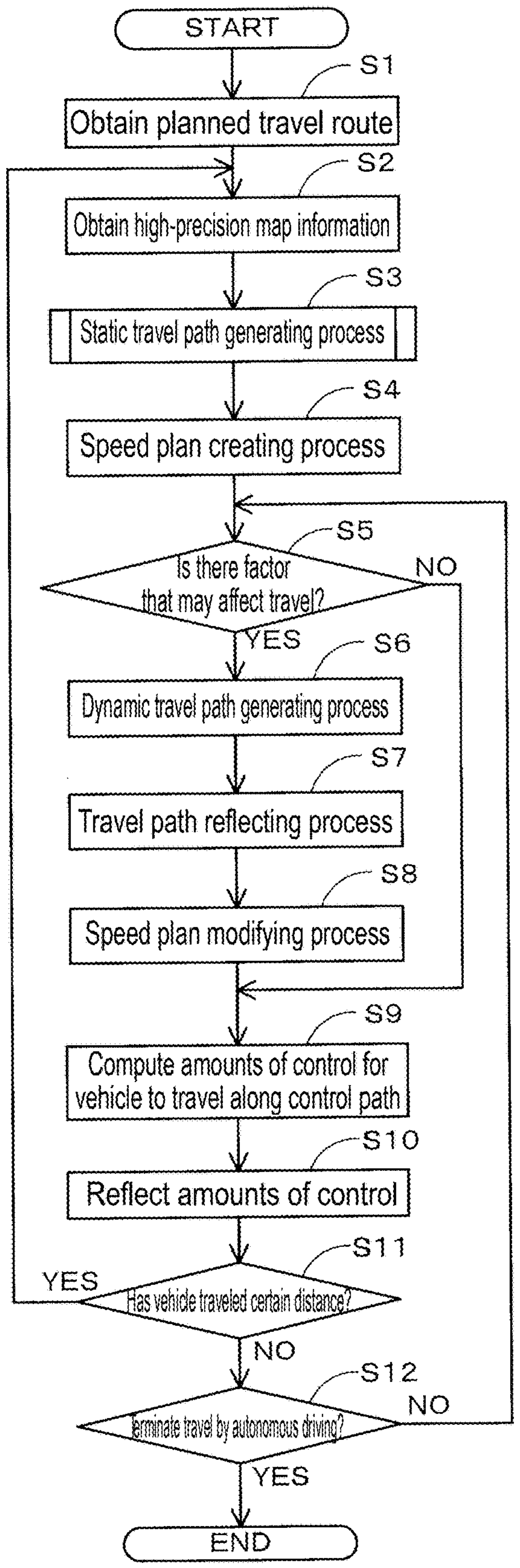
FIG. 4 is a flowchart of an autonomous driving assistance program according to the present embodiment.

Next, an autonomous driving assistance program executed by the CPU 51 in the navigation device 1 according to the present embodiment that has the above-described configuration will be described based on FIG. 4. FIG. 4 is a flowchart of the autonomous driving assistance program according to the present embodiment. Here, the autonomous driving assistance program is a program that is executed after the vehicle's ACC power supply (accessory power supply) is turned on and when vehicle's travel by autonomous driving assistance has started, and that performs assistance travel by autonomous driving assistance in accordance with assistance information generated by the navigation device 1. In addition, programs shown in flowcharts of the following FIGS. 4, 7, 10, and 11 are stored in the RAM 52 or the ROM 53 included in the navigation device 1, and are executed by the CPU 51.

First, in the autonomous driving assistance program, at step (hereinafter, abbreviated as S) 1, the CPU 51 obtains a route along which the vehicle is planning to travel in the future (hereinafter, referred to as planned travel route). Note that the planned travel route of the vehicle is, for example, a recommended route to a destination that is searched by the server device 4 in response to the user setting the destination. Note that when a destination is not set, a route where the vehicle travels along a road from a current location of the vehicle may serve as a planned travel route.

In addition, when a recommended route is searched, first, the CPU 51 transmits a route search request to the server device 4. Note that the route search request includes a terminal ID that identifies the navigation device 1 which is a sender of the route search request; and information that identifies a point of departure (e.g., a current location of the vehicle) and a destination. Note that upon re-searching, information that identifies a destination is not necessarily needed. Thereafter, the CPU 51 receives searched-route information transmitted from the server device 4 in response to the route search request. The searched-route information is information that identifies a recommended route (center route) from the point of departure to the destination which is searched by the server device 4 based on the transmitted route search request and using the latest version of map information (e.g., a series of links included in the recommended route). The search is performed using, for example, the publicly known Dijkstra's algorithm.

Note that in the above-described search for a recommended route, it is desirable to select a parking location (parking space) recommended for the vehicle to be parked in a parking lot at the destination, and search for a recommended route to the selected parking location. Namely, it is desirable that a recommended route to be searched also include, in addition to a route to a parking lot, a route indicating vehicle's movement in the parking lot. For example, from among open parking spaces in a parking lot, a parking space that is easy for the user to stop the vehicle (e.g., a parking space near an entrance to the parking lot or a parking space with no other vehicles parked on the left and right sides of the vehicle) is determined to be a candidate for a parking location recommended for the user to park the vehicle. In addition, for selection of a parking location, it is desirable to select a parking location with a less burden on the user, taking into account movement on foot after parking the vehicle or vehicle's movement upon pulling out of the parking location when leaving, in addition to vehicle's movement to the parking location.

In addition, a plurality of candidates for a parking location recommended for the vehicle to be parked may be selected. In addition, when a plurality of candidates for a parking location recommended for the vehicle to be parked have been selected, at the above-described S1, a recommended route to each parking location is obtained as a planned travel route, i.e., a plurality of candidates for a planned travel route are obtained. Furthermore, even when only one recommended parking location has been selected, if there are a plurality of possible recommended routes to the parking location, then a plurality of candidates for a planned travel route may be obtained. Note that when a plurality of candidates for a planned travel route have been obtained at the above-described S1, at S25 which will be described later, ways of moving into lanes are compared between the plurality of planned travel routes to determine one recommended way of moving into lanes, by which one parking location and one planned travel route are also determined.

In addition, when a traveling direction in which the vehicle can enter a parking lot where the user parks the vehicle from a road facing an entrance to the parking lot (hereinafter, referred to as entry road) is limited (e.g., only an entry by a left turn is allowed) which is learned by referring to connection information 18 indicating a connection relationship between a lane included in the entry road and the entrance to the parking lot, the server device 4 performs the above-described search for a travel route, taking also into account an entry direction. Note that for a method of searching for a route, search means other than Dijkstra's algorithm may be used. Note also that a search for a travel route at the above-described S1 may be performed by the navigation device 1 instead of the server device 4.

Then, at S2, the CPU 51 obtains high-precision map information 16, targeting areas that start from the current location of the vehicle and include the planned travel route obtained at the above-described S1.

Figure 5:
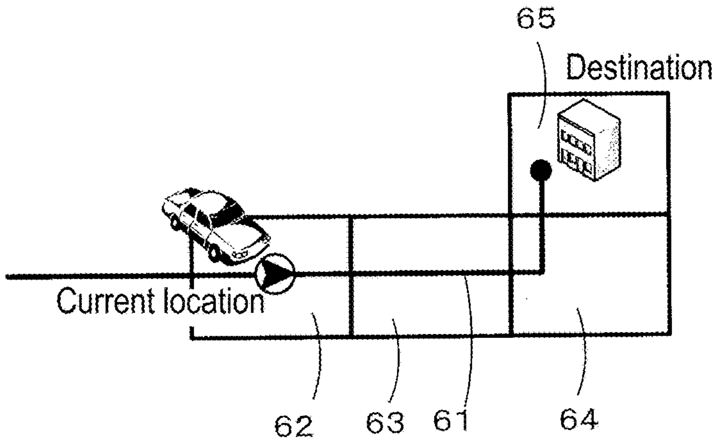
FIG. 5 is a diagram showing an area for which high-precision map information is obtained.

Here, as shown in FIG. 5, the high-precision map information 16 is stored in the high-precision map DB 13 of the server device 4 so as to be sectioned into rectangular portions (e.g., 500 m×1 km). Thus, for example, as shown in FIG. 5, when a route 61 is obtained as a travel route of the vehicle, high-precision map information 16 is obtained targeting areas 62 to 65 that include the route 61. Note, however, that when the distance to a destination is particularly far, for example, high-precision map information 16 may be obtained targeting only a secondary mesh in which the vehicle is currently located, or high-precision map information 16 may be obtained targeting only areas within a predetermined distance (e.g., within 3 km) from the current location of the vehicle.

The high-precision map information 16 includes, for example, information about the lane geometries of roads and markings (centerlines, lane lines, edge lines, guidelines, etc.) painted on the roads. In addition to such information, information about intersections, information about parking lots, etc., are also included. The high-precision map information 16 is basically obtained in the above-described units of rectangular areas from the server device 4, but when the cache 46 has high-precision map information 16 for an area that is already stored therein, the high-precision map information 16 is obtained from the cache 46. In addition, the high-precision map information 16 obtained from the server device 4 is temporarily stored in the cache 46.

In addition, at the above-described S2, the CPU 51 also likewise obtains connection information 18 indicating a connection relationship between a lane included in an entry road facing the entrance to the parking lot where the user parks the vehicle and the entrance to the parking lot, and outside-the-road geometry information 19 that identifies a region between the entry road and the entrance to the parking lot where the user parks the vehicle, through which the vehicle can pass.

Thereafter, at S3, the CPU 51 performs a static travel path generating process (FIG. 7) which will be described later. Here, the static travel path generating process is a process of generating, for roads included in the planned travel route, a static travel path which is a travel path recommended for the vehicle to travel along, based on the planned travel route of the vehicle and the high-precision map information 16 obtained at the above-described S2. Particularly, the CPU 51 generates, as a static travel path, a travel path that identifies not only a lane recommended for the vehicle to travel in, but also a specific travel position in the lane that is recommended for the vehicle to travel through. Note that when the distance to a destination is particularly far, only such a static travel path may be generated that targets a section from the current location of the vehicle to a point a predetermined distance ahead in a traveling direction (e.g., within a secondary mesh in which the vehicle is currently located). Note that the predetermined distance can be changed as appropriate, but a static travel path is generated targeting a region including at least an area outside an area (detection area) in which road conditions around the vehicle can be detected by the exterior camera 39 and other sensors.

Then, at S4, the CPU 51 creates a vehicle's speed plan used upon traveling along the static travel path generated at the above-described S3, based on the high-precision map information 16 obtained at the above-described S2. For example, vehicle's travel speeds recommended upon traveling along the static travel path are calculated taking into account speed limit information and speed change points (e.g., intersections, curves, railroad crossings, and crosswalks) present on the planned travel route.

Then, the speed plan created at the above-described S4 is stored in the flash memory 54, etc., as assistance information used for autonomous driving assistance. In addition, an acceleration plan indicating the acceleration and deceleration of the vehicle required to implement the speed plan created at the above-described S4 may also be created as assistance information used for autonomous driving assistance.

Subsequently, at S5, the CPU 51 determines, as road conditions around the vehicle, particularly, whether or not a factor that affects vehicle's travel is present around the vehicle, by performing image processing on a captured image having been captured with the exterior camera 39. Here, the "factor that affects vehicle's travel" to be determined at the above-described S5 is a dynamic factor that changes in real time, and static factors based on road structures are excluded. The factor that affects vehicle's travel corresponds, for example, to another vehicle that travels or is parked ahead in a traveling direction of the vehicle, vehicles stuck in a traffic jam, a pedestrian located ahead in the traveling direction of the vehicle, or a construction zone present ahead in the traveling direction of the vehicle. On the other hand, intersections, curves, railroad crossings, merge areas, lane reduction areas, etc., are excluded. In addition, even when there is another vehicle, a pedestrian, or a construction zone, if there is no possibility of them overlapping a future travel path of the vehicle (e.g., if they are located away from the future travel path of the vehicle), then they are excluded from the "factor that affects vehicle's travel". In addition, for means for detecting a factor that may affect vehicle's travel, a sensor such as millimeter-wave radar or a laser sensor, vehicle-to-vehicle communication, or roadside-device-to-vehicle communication may be used instead of a camera.

In addition, the determination process at the above-described S5 may be performed by, for example, managing, by an external server, the real-time locations of vehicles traveling on roads across the country, etc., and obtaining, by the CPU 51, the location of another vehicle located around the vehicle from the external server.

If it is determined that a factor that affects vehicle's travel is present around the vehicle (S5: YES), then processing transitions to S6. On the other hand, if it is determined that a factor that affects vehicle's travel is not present around the vehicle (S5: NO), then processing transitions to S9.

Figure 6:
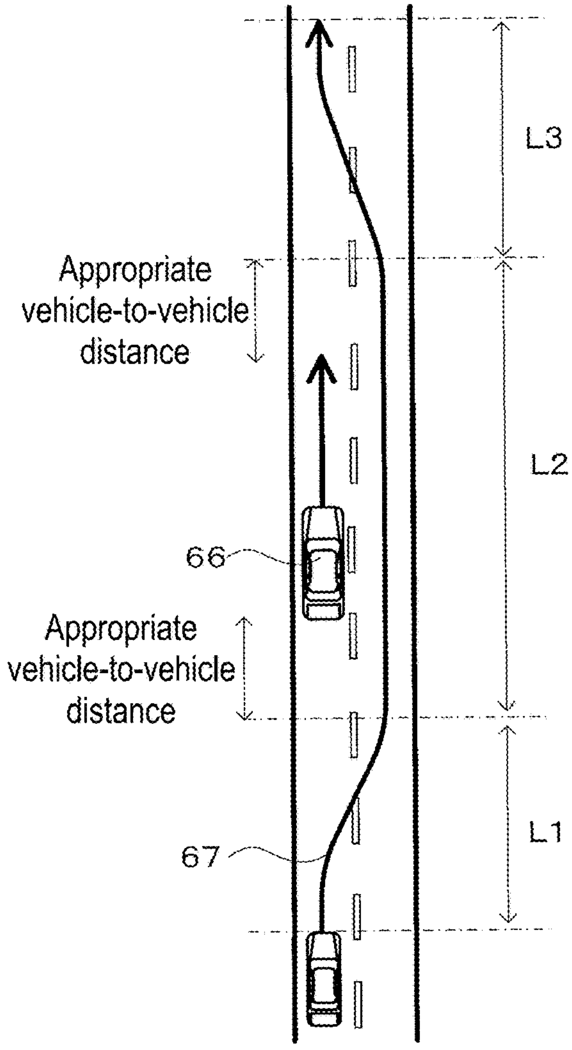
FIG. 6 is a diagram that describes a method of calculating a dynamic travel path.

At S6, the CPU 51 generates, as a dynamic travel path, a new path where the vehicle travels from the current location of the vehicle, avoiding or following the "factor that affects vehicle's travel" detected at the above-described S5, and then travels back to the static travel path. Note that the dynamic travel path is generated targeting a section including the "factor that affects vehicle's travel". Note also that the length of the section varies depending on what the factor is. For example, when the "factor that affects vehicle's travel" is another vehicle (vehicle ahead) traveling ahead of the vehicle, as a dynamic travel path 67, an avoidance path is generated which is a path where, as shown in FIG. 6, the vehicle changes its lane to the right to pass a vehicle ahead 66 and then changes its lane to the left to move back into the original lane. Note that as a dynamic travel path, a following path may be generated which is a path where the vehicle travels following the vehicle ahead 66 from behind with a predetermined distance therebetween (or travels side by side with the vehicle ahead 66) without passing the vehicle ahead 66. Furthermore, a plurality of candidates for a dynamic travel path may be generated, and in that case, from among the plurality of candidates, a candidate with the lowest cost is selected at S7 which will be described later.

A method of calculating the dynamic travel path 67 shown in FIG. 6 will be described as an example. The CPU 51 first calculates a first path L1 required for the vehicle to move into a right lane by starting turning of the steering and for the steering position to return to a straight-ahead direction. Note that for the first path L1, a path that is as smooth as possible and has the shortest possible distance required for a lane change is calculated using clothoid curves or an arc on conditions that lateral acceleration (lateral G) occurring upon making a lane change does not interfere with autonomous driving assistance and does not exceed an upper limit value (e.g., 0.2 G) at which a vehicle's occupant is not given a feeling of discomfort, the lateral G being calculated based on the current vehicle speed of the vehicle. In addition, another condition is that an appropriate vehicle-to-vehicle distance N or more is maintained between the vehicle and the vehicle ahead 66.

Then, a second path L2 is calculated where the vehicle travels in the right lane with a speed limit being an upper limit, to pass the vehicle ahead 66 until maintaining an appropriate vehicle-to-vehicle distance N or more between the vehicle and the vehicle ahead 66. Note that the second path L2 is basically a straight path, and the length of the path is calculated based on the vehicle speed of the vehicle ahead 66 and the speed limit for the road.

Subsequently, a third path L3 is calculated that is required for the vehicle to move back into the left lane by starting turning of the steering and for the steering position to return to the straight-ahead direction. Note that for the third path L3, a path that is as smooth as possible and has the shortest possible distance required for a lane change is calculated using clothoid curves or an arc on conditions that lateral acceleration (lateral G) occurring upon making a lane change does not interfere with autonomous driving assistance and does not exceed an upper limit value (e.g., 0.2 G) at which a vehicle's occupant is not given a feeling of discomfort, the lateral G being calculated based on the current vehicle speed of the vehicle. In addition, another condition is that an appropriate vehicle-to-vehicle distance N or more is maintained between the vehicle and the vehicle ahead 66.

Note that a dynamic travel path is generated based on road conditions around the vehicle which are obtained using the exterior camera 39 and other sensors, and thus, a region for which a dynamic travel path is to be generated is at least within an area (detection area) in which road conditions around the vehicle can be detected using the exterior camera 39 and other sensors.

Subsequently, at S7, the CPU 51 reflects the dynamic travel path which is newly generated at the above-described S6 in the static travel path generated at the above-described S3. Specifically, cost is calculated for each of the static travel path and the dynamic travel path (there may be a plurality of candidates for a dynamic travel path), starting from the current location of the vehicle to the end of a section including the "factor that affects vehicle's travel", and a travel path with the lowest cost is selected. Consequently, a part of the static travel path is replaced by the dynamic travel path as necessary. Note that depending on the situation, there may be a case of not performing replacement by the dynamic travel path, i.e., a case in which even if the dynamic travel path has been reflected, there has been no change from the static travel path generated at the above-described S3. Furthermore, there may be a case in which when the dynamic travel path and the static travel path are identical paths, even if replacement has been performed, there has been no change from the static travel path generated at the above-described S3.

Then, at S8, the CPU 51 modifies, for the static travel path in which the dynamic travel path has been reflected at the above-described S7, the vehicle's speed plan created at the above-described S4, based on changes made by the reflected dynamic travel path. Note that when there has been no change from the static travel path generated at the above-described S3 as a result of reflecting the dynamic travel path, the process at S8 may be omitted.

Subsequently, at S9, the CPU 51 computes the amounts of control for the vehicle to travel along the static travel path generated at the above-described S3 (when the dynamic travel path has been reflected at the above-described S7, a path obtained after the reflection) at speeds in accordance with the speed plan created at the above-described S4 (when the speed plan has been modified at the above-described S8, a plan obtained after the modification). Specifically, each of the amounts of control of an accelerator, a brake, a gear, and steering is computed. Note that the processes at S9 and S10 may be performed by the vehicle control ECU 40 that controls the vehicle, instead of the navigation device 1.

Thereafter, at S10, the CPU 51 reflects the amounts of control computed at S9. Specifically, the computed amounts of control are transmitted to the vehicle control ECU 40 through the CAN. The vehicle control ECU 40 performs vehicle control of each of the accelerator, the brake, the gear, and the steering based on the received amounts of control. As a result, it becomes possible to perform travel assistance control for the vehicle to travel along the static travel path generated at the above-described S3 (when the dynamic travel path has been reflected at the above-described S7, a path obtained after the reflection) at speeds in accordance with the speed plan created at the above-described S4 (when the speed plan has been modified at the above-described S8, a plan obtained after the modification).

Then, at S11, the CPU 51 determines whether or not the vehicle has traveled a certain distance since the generation of a static travel path at the above-described S3. For example, the certain distance is 1 km.

If it is determined that the vehicle has traveled a certain distance since the generation of a static travel path at the above-described S3 (S11: YES), then processing returns to S2. Thereafter, a static travel path is generated again, targeting a section within a predetermined distance from a current location of the vehicle along the planned travel route (S2 to S4). Note that, in the present embodiment, every time the vehicle has traveled a certain distance (e.g., 1 km), a static travel path is repeatedly generated targeting a section within a predetermined distance from a current location of the vehicle along the travel route, but when the distance to a destination is short, static travel paths to the destination may be generated at once at the time of starting traveling.

On the other hand, if it is determined that the vehicle has not traveled a certain distance since the generation of a static travel path at the above-described S3 (S11: NO), then it is determined whether or not to terminate the assistance travel by autonomous driving assistance (S12). A case of terminating the assistance travel by autonomous driving assistance includes a case in which the travel by autonomous driving assistance is intentionally canceled (override) by the user operating a control panel provided on the vehicle or by the user performing a steering wheel operation, a brake operation, etc., in addition to a case in which the vehicle has reached the destination.

If it is determined to terminate the assistance travel by autonomous driving assistance (S12: YES), then the autonomous driving assistance program is terminated. On the other hand, if it is determined to continue the assistance travel by autonomous driving assistance (S12: NO), then processing returns to S5.

Figure 7:
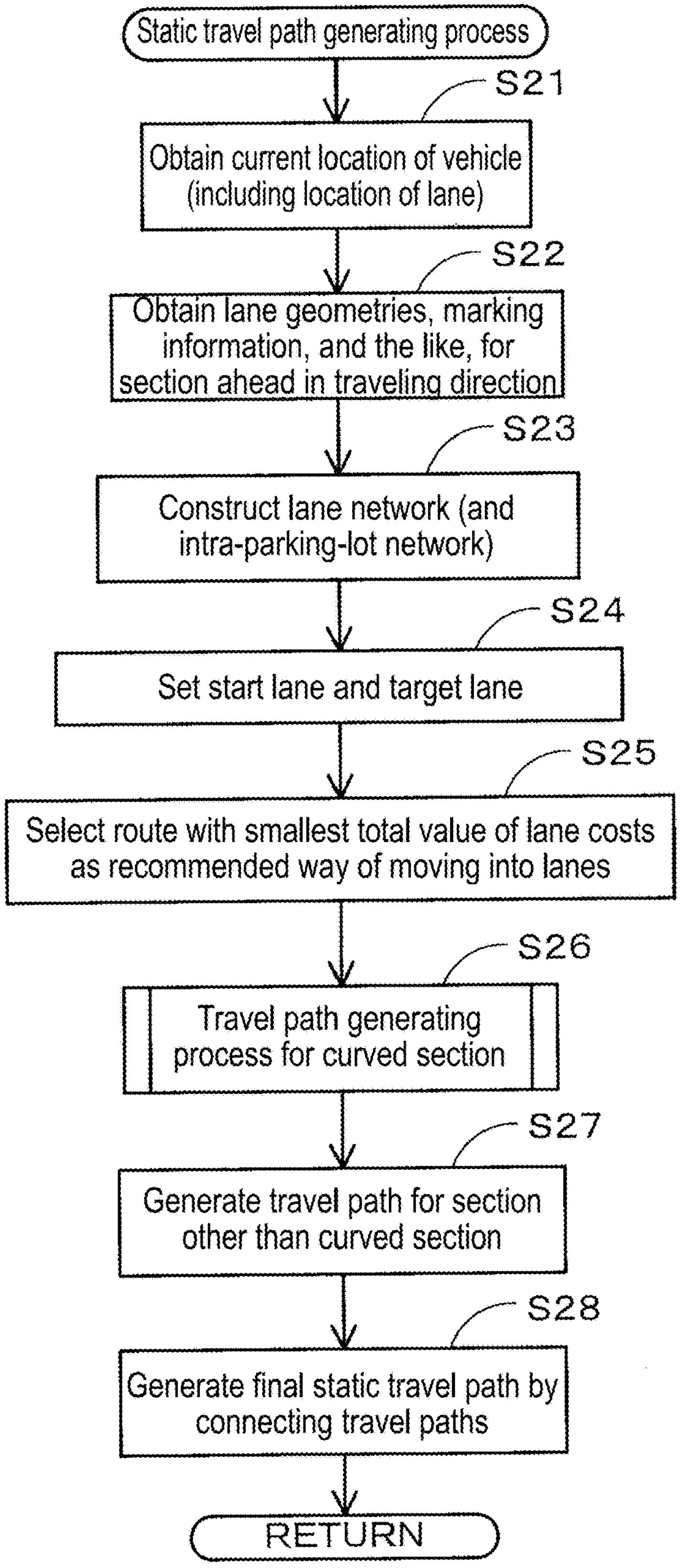
FIG. 7 is a flowchart of a subprocess program of a static travel path generating process.

Next, a subprocess of the static travel path generating process performed at the above-described S3 will be described based on FIG. 7. FIG. 7 is a flowchart of a subprocess program of the static travel path generating process.

First, at S21, the CPU 51 obtains a current location of the vehicle detected by the current location detecting part 31. Note that it is desirable to specifically identify a current location of the vehicle using, for example, high-precision GPS information or a high-precision location technique. Here, the high-precision location technique is a technique in which white lines and road surface painting information that are captured with a camera installed on the vehicle are detected by image recognition, and furthermore, the detected white lines and road surface painting information are checked against, for example, high-precision map information 16, by which a driving lane and a high-precision vehicle location can be detected. Furthermore, when the vehicle travels on a road having a plurality of lanes, a lane in which the vehicle travels is also identified. In addition, when the vehicle is located in a parking lot, a specific location in the parking lot (e.g., a parking space where the vehicle is located) and the attitude of the vehicle (e.g., a traveling direction of the vehicle, or when the vehicle is located in a parking space, in which orientation the vehicle is parked in the parking space) are also identified.

Then, at S22, the CPU 51 obtains lane geometries, marking information, information about intersections, etc., targeting, particularly, a section for which a static travel path ahead in a traveling direction of the vehicle is to be generated (e.g., a portion of the planned travel route within a predetermined distance from the current location of the vehicle), based on the high-precision map information 16 obtained at the above-described S2. Note that the lane geometries and marking information obtained at the above-described S22 include, particularly, information that identifies how a lane that can be selected as a lane in which the vehicle is to travel is placed on a road, and further include, for example, information that identifies the number of lanes, the types and layout of markings that mark off the lanes, lane widths, how and at which location the number of lanes increases or decreases when there is an increase or decrease in the number of lanes, a passage segment in a traveling direction for each lane, and a connection to a road for each lane (specifically, a correspondence between a lane included in a road before passing through an intersection and a lane included in a road after passing through the intersection).

Subsequently, at S23, the CPU 51 constructs a lane network, targeting the section for which a static travel path ahead in a traveling direction of the vehicle is to be generated, based on the lane geometries and marking information obtained at the above-described S22. Here, the lane network is a network representing movement into lanes that can be selected by the vehicle.

Figure 8:
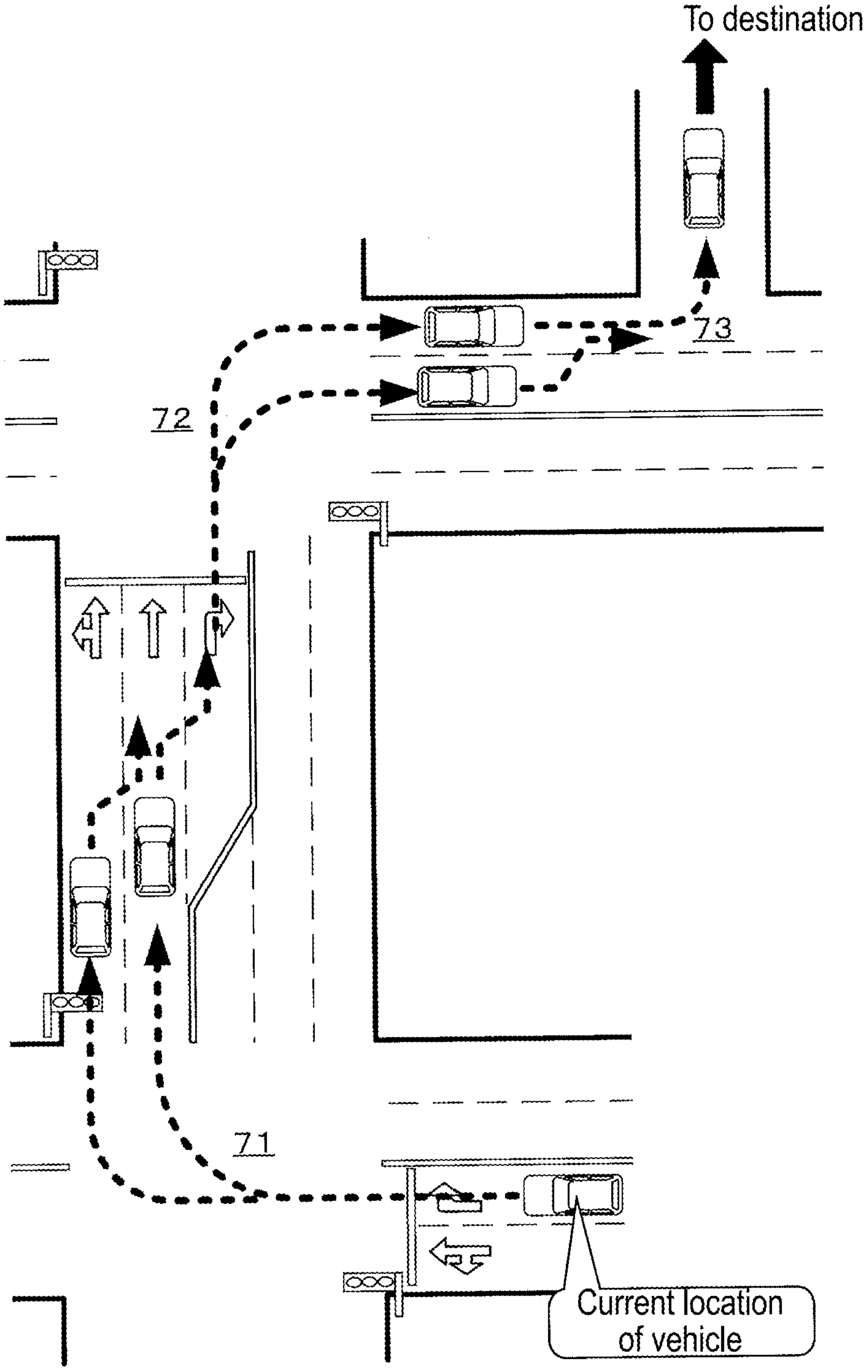
FIG. 8 is a diagram showing an example of a planned travel route of a vehicle.

Here, as an example of constructing a lane network at the above-described S23, for example, a case in which the vehicle travels along a planned travel route shown in FIG. 8 will be described as an example. The planned travel route shown in FIG. 8 is a route where after the vehicle travels straight ahead from its current location, the vehicle turns right at a next intersection 71 and further turns right at a next intersection 72, too, and turns left at a next intersection 73. In the planned travel route shown in FIG. 8, for example, when the vehicle turns right at the intersection 71, the vehicle can enter a right lane and can also enter a left lane. Note, however, that since the vehicle needs to turn right at the next intersection 72, the vehicle needs to move into the rightmost lane at the time of entering the intersection 72. In addition, when the vehicle turns right at the intersection 72, too, the vehicle can enter a right lane and can also enter a left lane. Note, however, that since the vehicle needs to turn left at the next intersection 73, the vehicle needs to move into the leftmost lane at the time of entering the intersection 73. A lane network constructed targeting a section that allows such movement into lanes is shown in FIG. 9.

Figure 9:
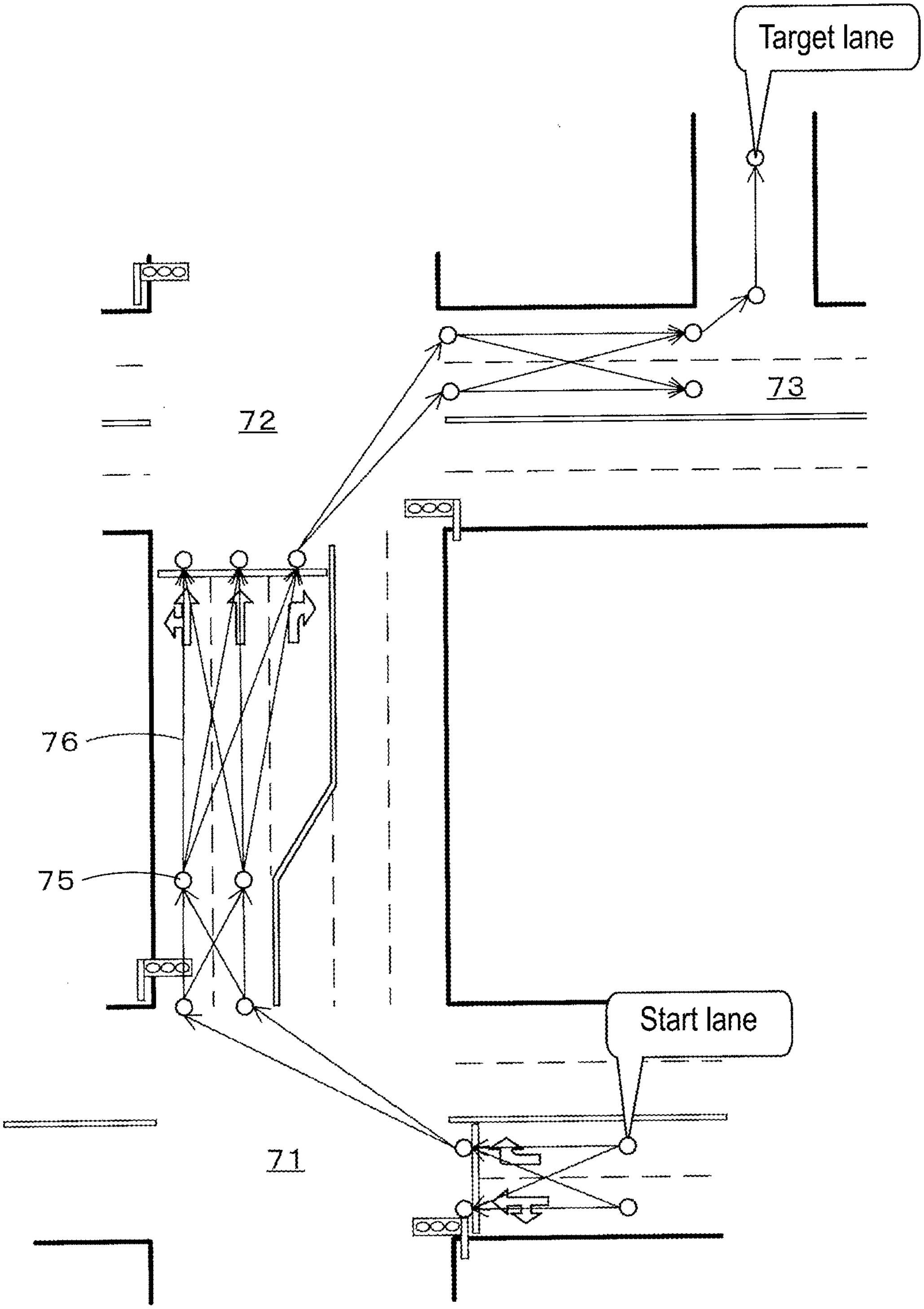
FIG. 9 is a diagram showing an example of a lane network constructed for the planned travel route shown in FIG. 8.

As shown in FIG. 9, in the lane network, a section for which a static travel path ahead in a traveling direction of the vehicle is to be generated is divided into a plurality of blocks (groups). Specifically, the section is divided into blocks, with a location where the vehicle enters an intersection, a location where the vehicle exits the intersection, and a location where the number of lanes increases or decreases being boundaries. A node point (hereinafter, referred to as lane node) 75 is set at a point in each lane located at a boundary of each divided block. Furthermore, a link (hereinafter, referred to as lane link) 76 that connects lane nodes 75 is set. Note that the lane link 76 is basically set in the center of a lane when the lane link 76 does not cross lanes.

In addition, the above-described lane network includes, particularly, information that identifies, by a connection of lane nodes to a lane link at an intersection, a correspondence between a lane included in a road before passing through the intersection and a lane included in a road after passing through the intersection, i.e., a lane into which the vehicle can move after passing through the intersection from a lane in which the vehicle travels before passing through the intersection. Specifically, the lane network indicates that the vehicle can move between lanes corresponding to lane nodes that are connected by a lane link among lane nodes set on a road on which the vehicle travels before passing through an intersection and lane nodes set on a road on which the vehicle travels after passing through the intersection. To generate such a lane network, high-precision map information 16 stores, for each road connected to an intersection, lane flags indicating a correspondence between lanes and set for each combination of a road that enters the intersection and a road that exits the intersection. Upon constructing a lane network at the above-described S23, the CPU 51 forms a connection of lane nodes to a lane link at an intersection by referring to the lane flags.

Note that although FIG. 9 shows an example of a lane network constructed targeting roads, if a section for which a static travel path is to be generated includes an area in a parking lot, then a similar network is constructed also targeting the area in a parking lot (hereinafter, referred to as intra-parking-lot network). The intra-parking-lot network includes parking lot nodes and parking lot links. The parking lot nodes are set at the entrance/exit of the parking lot, an intersection at which passages through which the vehicle can pass intersect each other, a curved corner of a passage through which the vehicle can pass (i.e., a connecting point between passages), and an end point of a passage. On the other hand, the parking lot links each are set on a passage between parking lot nodes, through which the vehicle can pass.

Note that when a plurality of candidates for a planned travel route have been obtained at the above-described S1, the above-described lane network and intra-parking-lot network are constructed for the plurality of planned travel routes.

Then, at S24, for the lane network constructed at the above-described S23 (if the section for which a static travel path is to be generated includes an area in a parking lot, then an intra-parking-lot network is also included; the same also applies hereinafter), the CPU 51 sets a start lane (departure node), in which the vehicle starts moving, at a lane node located at a starting point of the lane network, and sets a target lane (target node), which is a target to which the vehicle moves, at a lane node located at an end point of the lane network. Note that when the starting point of the lane network is a road with a plurality of lanes in each direction, a lane node corresponding to a lane in which the vehicle is currently located serves as a start lane. On the other hand, when the end point of the lane network is a road with a plurality of lanes in each direction, a lane node corresponding to the leftmost lane (in a case of left-hand traffic) serves as a target lane. In addition, when the starting point or end point of the lane network is in a parking lot, a start lane is set in a parking space or on a passage in the intra-parking-lot network where the vehicle is currently located, and a target lane is set in a parking space where the vehicle is to be parked or on a passage that allows the vehicle to enter the parking space.

Thereafter, at S25, the CPU 51 derives a route with the lowest lane cost (hereinafter, referred to as recommended route) among routes each continuously connecting the start lane to the target lane, by referring to the lane network constructed at the above-described S23. For example, using Dijkstra's algorithm, a route is searched from a target-lane side. Note, however, that search means other than Dijkstra's algorithm may be used as long as a route that continuously connects the start lane to the target lane can be searched. The derived recommended route is a way of moving into lanes by the vehicle that is recommended upon vehicle's movement (information that identifies lanes recommended for the vehicle to travel in and recommended locations for moving into lanes).

In addition, a lane cost used for the above-described route search is provided for each lane link 76. The lane cost provided to each lane link 76 has, as a reference value, the length of the lane link 76 or the time required to move on the lane link 76. Particularly, in the present embodiment, the length of a lane link (in units of meters) is used as the reference value of the lane cost. In addition, for a lane link involving a lane change, a lane change cost (e.g., 50) is added to the above-described reference value. Note that the value of the lane change cost may be changed according to the number of lane changes or a location where a lane change is made. For example, when a lane change is made at a location near an intersection or when a lane change over two lanes is made, a larger value of the lane change cost to be added can be set.

Note that when a plurality of candidates for a planned travel route have been obtained at the above-described S1, a recommended route with the lowest lane cost is derived from among the plurality of planned travel routes. By the derived recommended route, one planned travel route is also determined.

Figure 10:
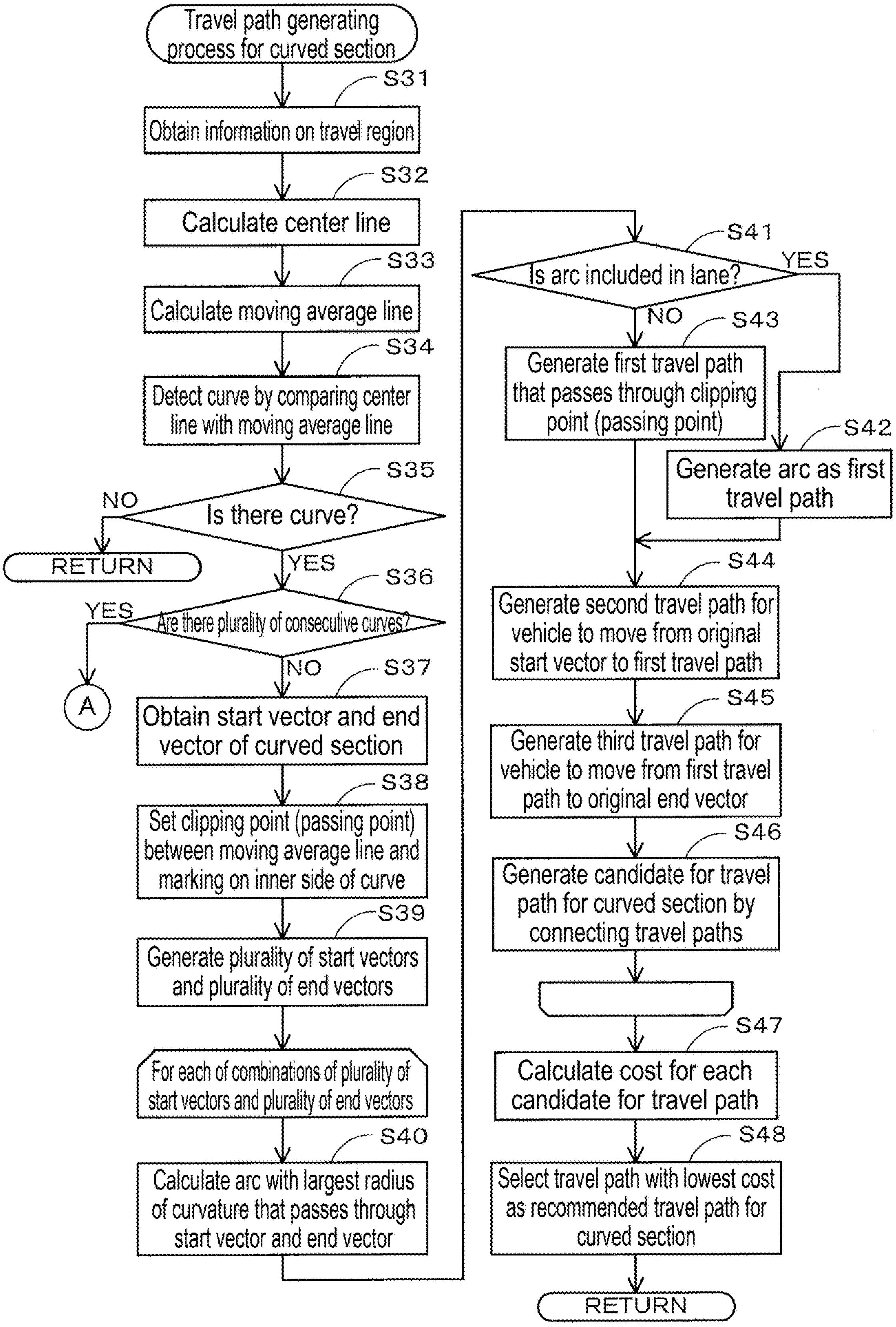
FIG. 10 is a flowchart of a subprocess program of a travel path generating process for a curved section.
Figure 11:
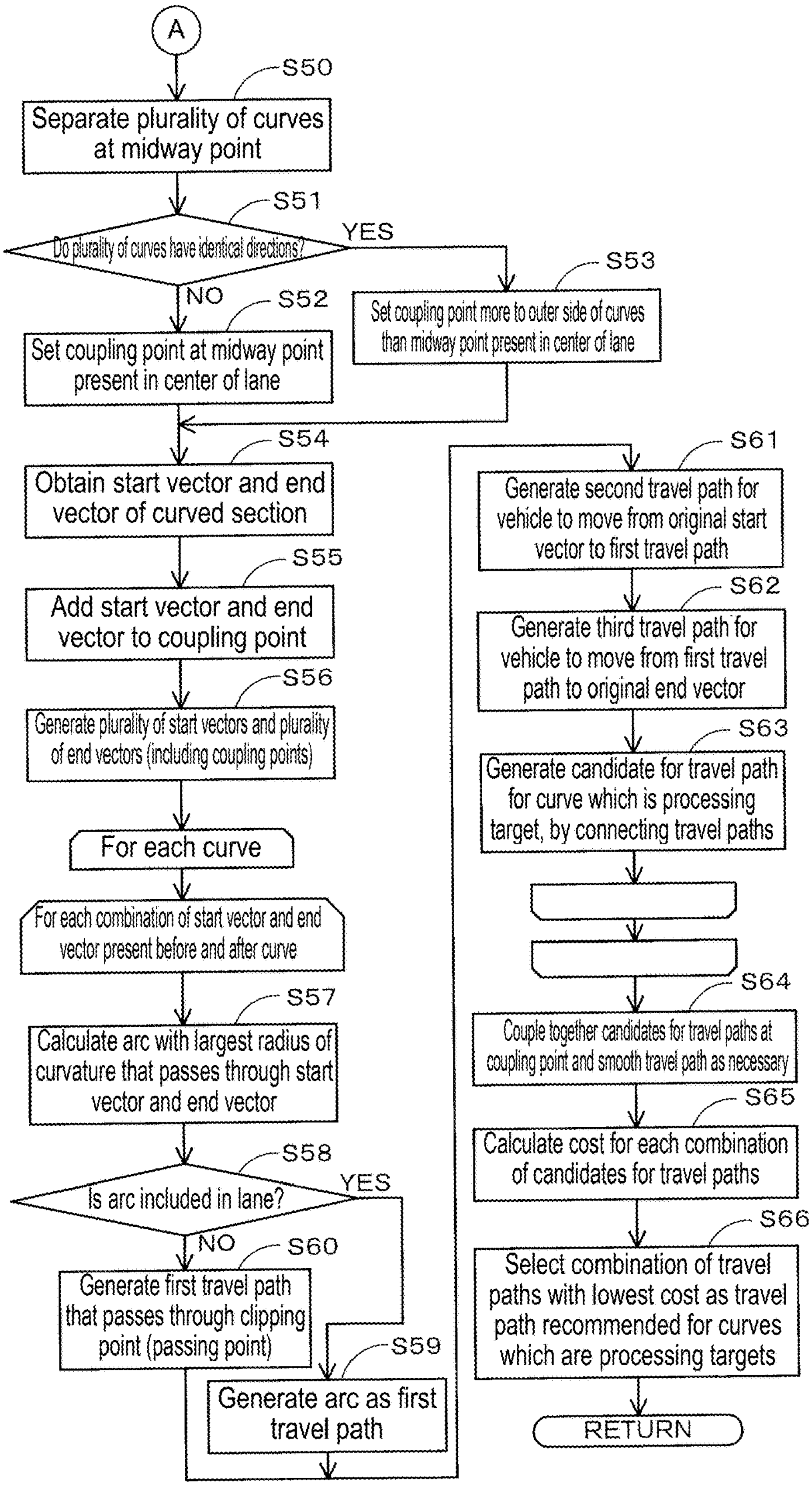
FIG. 11 is a flowchart of a subprocess program of the travel path generating process for a curved section.

Subsequently, at S26, the CPU 51 performs a travel path generating process for a curved section which will be described later (FIGS. 10 and 11). The travel path calculating process for a curved section is a process of generating a travel path recommended upon traveling along the recommended route derived at the above-described S25, targeting, particularly, a curved section including a curve that is a part of the planned travel route for a section for which a static travel path ahead in a traveling direction of the vehicle is to be generated. Note that for a case in which the planned travel route includes a plurality of curved sections, a recommended travel path is generated for each of the plurality of curved sections. Here, the "curve" includes the shape of a road that curves at a predetermined angle such as a right angle (e.g., an L-junction), in addition to the shape of a road that curves at a predetermined curvature in an arc-shaped manner. Meanwhile, in the present embodiment, a curve through which the vehicle passes, traveling in the same lane on a road is assumed, and a curve present within an intersection or around a tollgate where a lane is cut off and a curve present at an entrance/exit of a parking lot are excluded from curves at the above-described S26.

Thereafter, at S27, the CPU 51 generates, for a section other than the above-described curved section, a travel path recommended upon traveling along the recommended route derived at the above-described S25. For example, for a travel path for a section involving lane changes, the locations of the lane changes are set such that the lane changes are not continuously made as much as possible and are made at locations away from an intersection. In addition, particularly, in a case of generating a travel path for making a left or right turn at an intersection or making a lane change, lateral acceleration (lateral G) occurring in the vehicle is calculated, and paths that are connected as smoothly as possible using clothoid curves are calculated on conditions that the lateral G does not interfere with autonomous driving assistance and does not exceed an upper limit value (e.g., 0.2 G) at which a vehicle's occupant is not given a feeling of discomfort. By performing the above-described process, a travel path recommended for the vehicle to travel along is generated for roads included in the planned travel route. Note that for a block that is none of a curved section, a block in which a lane change is made, and a block within an intersection, a path that passes through the center of a lane is a travel path recommended for the vehicle to travel along. Note also that when a section for which a static travel path is to be generated includes entry into or exit from a parking space, a travel path for entering or exiting the parking space is also generated.

At S28, the CPU 51 combines together the travel paths calculated at the above-described S26 and S27, by which a static travel path which is a travel path recommended for the vehicle to travel along is generated for roads included in the planned travel route. The static travel path generated at the above-described S28 is stored in the flash memory 54, etc., as assistance information used for autonomous driving assistance. Thereafter, processing transitions to S4, and various types of driving assistance based on the generated static travel path are provided.

Next, a subprocess of the travel path calculating process for a curved section performed at the above-described S26 will be described based on FIG. 10. FIG. 10 is a flowchart of a subprocess program of the travel path calculating process for a curved section.

First, at S31, the CPU 51 obtains information that identifies a travel region in which the vehicle travels, targeting a section for which a static travel path ahead in a traveling direction of the vehicle is to be generated, based on the high-precision map information 16 obtained at the above-described S2. Specifically, there is obtained information that identifies the locations of left and right markings in a lane in which the vehicle travels when the vehicle travels in accordance with the way of moving into lanes selected at the above-described S25 (for a one-lane road or a road with no marked lanes, road edges).

Then, at S32, the CPU 51 calculates a center line of the lane in which the vehicle travels, targeting the section for which a static travel path ahead in a traveling direction of the vehicle is to be generated, based on the information on the travel region obtained at the above-described S31. For example, it is possible to calculate a center line located in the middle of the locations of the left and right markings or the locations of road edges in the travel region. Note, however, that instead of calculating a center line from the markings, it is also possible to calculate, for each lane, a center line in advance and store the center lines in the high-precision map DB 13.

Subsequently, at S33, the CPU 51 calculates a moving average line for the lane in which the vehicle travels, targeting the section for which a static travel path ahead in a traveling direction of the vehicle is to be generated, based on the center line calculated at the above-described S32. Note that the moving average line is a line that connects average points of a predetermined number of consecutive coordinate points placed along the center line of the lane. More specifically, for each of coordinate points set at predetermined spacings along the center line, an average point of five coordinate points including two coordinate points present each of before and after the coordinate point (a point obtained by averaging latitude and longitude points) is calculated, and a line that connects the average points serves as a moving average line. Note, however, that instead of calculating a moving average line from the center line, it is also possible to calculate, for each lane, a moving average line in advance and store the moving average lines in the high-precision map DB 13.

Figure 12:
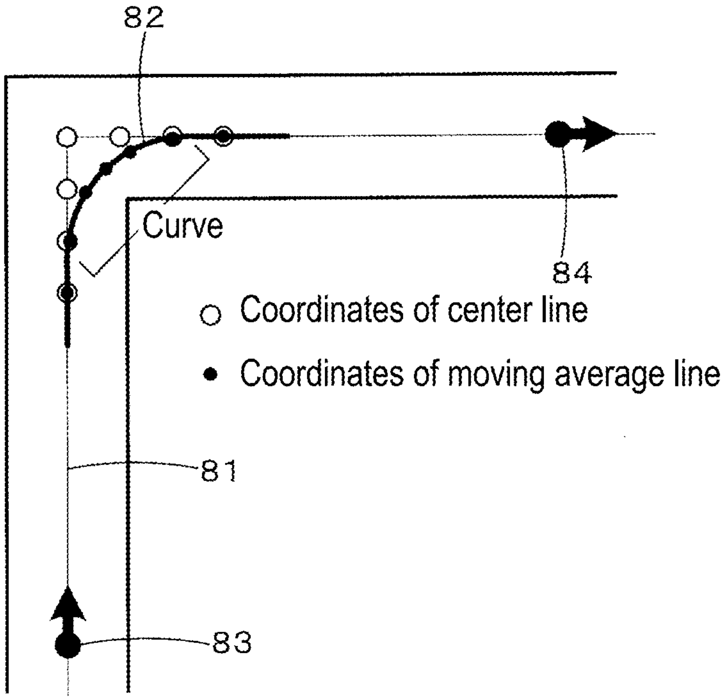
FIG. 12 is a diagram showing an example of a curved section including a non-consecutive curve.

Furthermore, at S34, the CPU 51 compares the center line calculated at the above-described S32 with the moving average line calculated at the above-described S33 to detect an area where the center line does not coincide with the moving average line, as an area where there is a curve. Here, FIG. 12 is a diagram showing an example of a center line 81 and a moving average line 82 which are calculated at the above-described S31 and S32. As described above, the moving average line 82 is a line obtained by calculating, for each of coordinate points set at predetermined spacings along the center line 81, an average point of five coordinate points including two coordinate points present each of before and after the coordinate point (a point obtained by averaging latitude and longitude points), and connecting the average points. Thus, in a section where the center line 81 is linearly placed, the center line 81 coincides with the moving average line 82, but as shown in FIG. 12, at a location where the road curves in an arc-shaped manner or a location where the road curves at a predetermined angle, there is an area where the center line 81 does not coincide with the moving average line 82. Thus, at the above-described S34, an area where the center line 81 does not coincide with the moving average line 82 is detected as an area where there is a curve.

Note that at the above-described S34, the CPU 51 detects a curve present in the section for which a static travel path ahead in a traveling direction of the vehicle is to be generated, by comparing the center line 81 with the moving average line 82, but it is also possible to detect a curve based on map information. In that case, the map information is configured to include in advance information that identifies the location of a curve (e.g., information that identifies a link corresponding to a curve or the coordinates of a starting point and an end point of a curve).

Subsequently, at S35, the CPU 51 determines, based on a result of the detection at the above-described S34, whether or not at least one or more curves are present in the section for which a static travel path ahead in a traveling direction of the vehicle is to be generated.

If it is determined that at least one or more curves are present in the section for which a static travel path ahead in a traveling direction of the vehicle is to be generated (S35: YES), then processing transitions to S36. On the other hand, if it is determined that a curve is not present in the section for which a static travel path ahead in a traveling direction of the vehicle is to be generated (S35: NO), then processing transitions to S27 and a travel path recommended upon traveling along the recommended route derived at the above-described S25 is generated.

Figure 13:
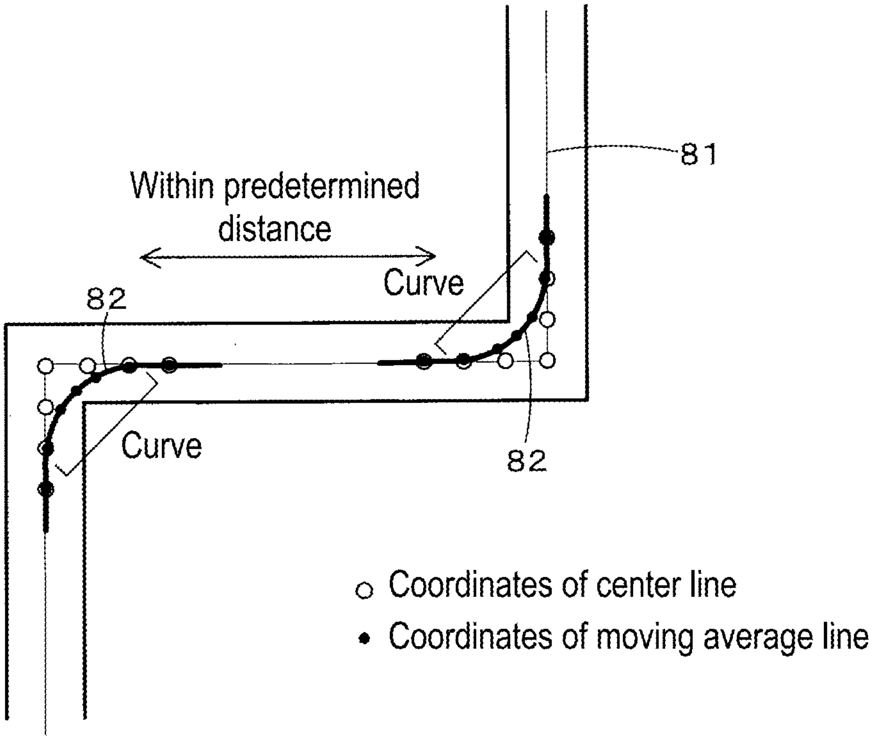
FIG. 13 is a diagram showing an example of a curved section including a plurality of consecutive curves.

At S36, the CPU 51 determines, based on the result of the detection at the above-described S34, whether or not at least two or more curves are consecutively present at spacings within a predetermined distance (e.g., 30 m) in the section for which a static travel path ahead in a traveling direction of the vehicle is to be generated. Specifically, conditions for the determination are that as shown in FIG. 13, there are two or more areas where the center line 81 does not coincide with the moving average line 82; the center line 81 coincides with the moving average line 82 in an area between the areas (for a case in which the center line 81 does not coincide with the moving average line 82, it is considered to be a single curve instead of a plurality of consecutive curves); and furthermore, the area between the areas is within a predetermined distance. For example, it is determined to be "YES" when a crank or an S-curve is present in the section for which a static travel path ahead in a traveling direction of the vehicle is to be generated.

If it is determined that at least two or more curves are consecutively present at spacings within a predetermined distance in the section for which a static travel path ahead in a traveling direction of the vehicle is to be generated (S36: YES), then processing transitions to S50. On the other hand, if it is determined that two or more curves are not consecutively present at spacings within a predetermined distance (S36: NO), then processing transitions to S37.

At and subsequent to S37, a travel path recommended upon traveling on a curved section including the non-consecutive curve detected as described above is generated by the following processes, targeting the curved section. Note that when a plurality of non-consecutive curves have been detected, the following processes are performed targeting each of curved sections corresponding to all of the detected curves, by which a travel path is generated.

First, at S37, the CPU 51 obtains each of a start vector that identifies the position and direction of the vehicle at a starting point of a curved section for a case of traveling along the planned travel route in accordance with the way of moving into lanes selected at the above-described S25, and an end vector that identifies the position and direction of the vehicle at an end point of the curved section.

The positions of the starting point and end point of the curved section may be changed as appropriate according to the way of moving into lanes selected at the above-described S25, or may be set on a fixed condition, regardless of the way of moving into lanes. For example, it is possible to set, as a starting point of a curved section, a point a predetermined distance (e.g., 20 m) before a starting point of a section where the center line 81 starts to not coincide with the moving average line 82, and set, as an end point of the curved section, a point a predetermined distance ahead, toward a traveling-direction side, of an end point of the section where the center line 81 starts to not coincide with the moving average line 82. In addition, when the current location of the vehicle is before a curve, the current location of the vehicle may serve as a starting point of a curved section. In addition, map information may be configured to include in advance information that identifies curves and curved sections (e.g., information that identifies a link included in a curved section or the coordinates of a starting point and an end point of a curved section), and a curved section may be set based on the map information.

Here, the positions of the start vector and the end vector in a traveling direction on a road (positions in a forward-backward direction) are positions corresponding to the above-described starting point and end point of the curved section.

On the other hand, the positions of the start vector and the end vector in a road-width direction are basically the center of a lane in which the vehicle travels (for a one-lane road or a road with no marked lanes, the positions also correspond to the center of the road).

Furthermore, the directions of the start vector and the end vector are basically directions parallel to the traveling direction on the road (road-length direction).

Note, however, that for example, a case in which the vehicle requires a special vehicle operation, such as a lane change or a left or right turn, before a curved section is an exception, and the positions of the start vector and the end vector in the road-width direction may be set more to the left or right than the center of the lane, and the directions may also be set to be inclined relative to the traveling direction on the road.

FIG. 12 is a diagram showing an example of a start vector 83 and an end vector 84 which are set for a curved section including a curve that curves at a right angle. In the example shown in FIG. 12, the start vector 83 is set at a point in the center of a lane and a predetermined distance before a starting point of a section where the center line 81 starts to not coincide with the moving average line 82, and the end vector 84 is set at a point in the center of the lane and a predetermined distance ahead, toward a traveling-direction side, of an end point of the section where the center line 81 starts to not coincide with the moving average line 82. Note that the directions of the start vector 83 and the end vector 84 are directions both parallel to a traveling direction on a road (road-length direction).

Figure 14:
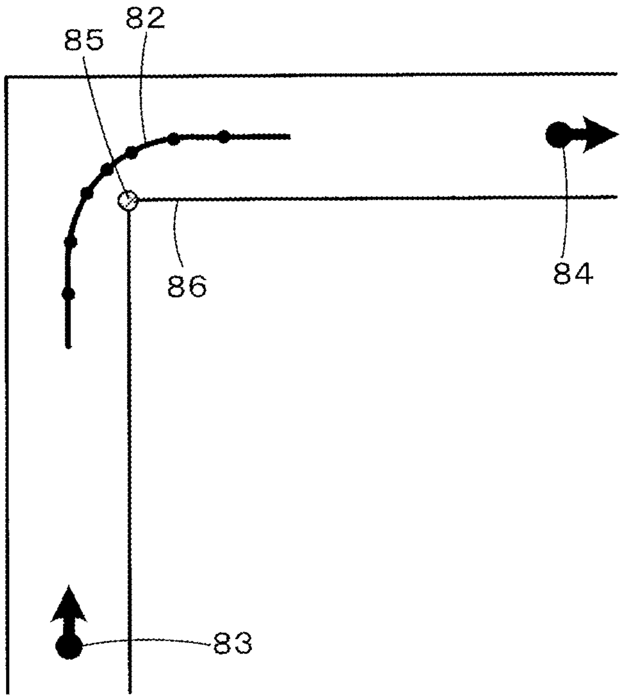
FIG. 14 is a diagram that describes a method of setting a clipping point.

Thereafter, at S38, the CPU 51 sets a clipping point (passing point) 85 between the moving average line calculated at the above-described S33 and a marking on an inner side of the curve. Here, the clipping point 85 can be set as appropriate between any of the coordinate points placed along the center line 81 and the marking on the inner side of the curve, more appropriately, between the moving average line and the marking on the inner side of the curve. For example, as shown in FIG. 14, the closest point of a marking 86 on an inner side of the curve to the moving average line 82 is set as the clipping point 85. Note that as shown in FIG. 12, basically, the moving average line 82 is located closer to the marking on the inner side of the curve than the center line 81, and thus, by setting the clipping point 85 between the moving average line 82 and the marking on the inner side of the curve, the clipping point 85 is located between any of the coordinate points placed along the center line 81 and the marking on the inner side of the curve. Note, however, that the example shown in FIG. 14 is a case in which the vehicle width of the vehicle is 0, and if the vehicle width is considered, then it is desirable to set the clipping point 85 at a location more to a center-line side by ½ of the vehicle width of the vehicle than the closest point of the marking 86 on the inner side of the curve to the moving average line 82, or at a location more to the center-line side by $½+\alpha$ (e.g., 30 cm) of the vehicle width of the vehicle, taking into account an error, etc.

Figure 15:
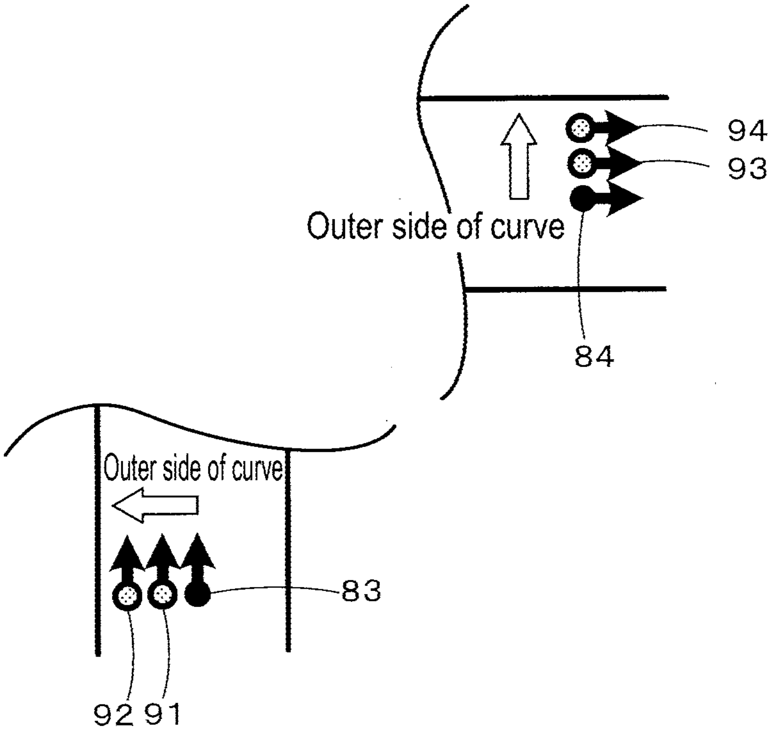
FIG. 15 is a diagram that describes an example of generating a plurality of start vectors and a plurality of end vectors.

Subsequently, at S39, the CPU 51 generates, in addition to the start vector obtained at the above-described S37, new candidates for a start vector at a starting point of a curved section for which a travel path is to be generated. Furthermore, in addition to the end vector obtained at the above-described S37, new candidates for an end vector are generated at an end point of the curved section. For example, in an example shown in FIG. 15, a new start vector 91 is generated at a point moved a predetermined distance (e.g., ¼ or ⅙ of lane width) more toward a direction of the outer side of the curve than the original start vector 83, and a new start vector 92 is generated at a point further moved a predetermined distance (e.g., ¼ or ⅙ of lane width) in the direction of the outer side of the curve. Likewise, a new end vector 93 is generated at a point moved a predetermined distance (e.g., ¼ or ⅙ of lane width) more toward the direction of the outer side of the curve than the original end vector 84, and a new end vector 94 is generated at a point further moved a predetermined distance (e.g., ¼ or ⅙ of lane width) in the direction of the outer side of the curve. Note that although, in the example shown in FIG. 15, two new candidates are generated for each of a start vector and an end vector, only one or three or more candidates may be generated. Note also that it is also possible to generate candidates in a direction of the inner side of the curve. By generating many new candidates for a start vector and an end vector, a more appropriate travel path can be more likely to be generated, but on the other hand, since the number of candidates for a travel path increases, processing load on calculation of travel paths increases.

Subsequent processes from S40 to S46 are performed for each of a combination of the start vector and the end vector that are obtained at the above-described S37 and combinations of the start vectors and the end vectors that are further newly generated at the above-described S38. For example, in the example shown in FIG. 15, there are three start vectors and three end vectors, and thus, the processes from S40 to S46 are performed for nine (3×3) combinations in total. After performing the processes from S40 to S46 for all combinations of a start vector and an end vector, processing transitions to S47.

First, at S40, the CPU 51 calculates an arc with the largest radius of curvature that passes through a start vector and an end vector which are processing targets in traveling directions of the respective vectors (i.e., the tangential directions of the arc coincide with the traveling directions of the respective vectors).

Thereafter, at S41, the CPU 51 determines whether or not the arc calculated at the above-described S40 is included in a portion of a lane between the start vector and the end vector in which the vehicle travels (in the travel region obtained at the above-described S31).

If it is determined that the arc calculated at the above-described S40 is included in a portion of a lane between the start vector and the end vector in which the vehicle travels (in the travel region obtained at the above-described S31)

(S41: YES), then processing transitions to S42. On the other hand, if it is determined that the arc calculated at the above-described S40 is not included in a portion of a lane between the start vector and the end vector in which the vehicle travels (in the travel region obtained at the above-described S31) (S41: NO), then processing transitions to S43.

Figure 16:
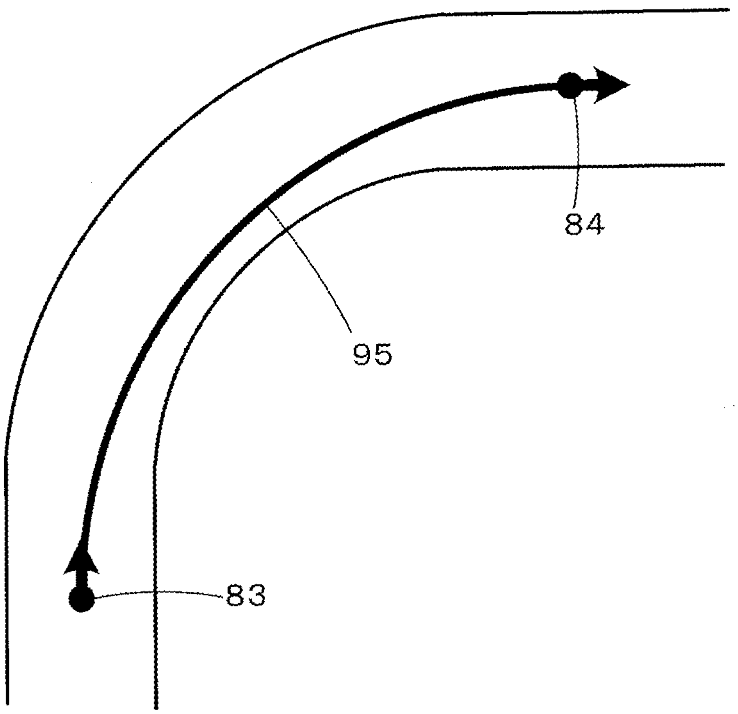
FIG. 16 is a diagram that describes a case in which an arc with the largest radius of curvature that passes through a start vector and an end vector in traveling directions of the respective vectors is included in a lane in which the vehicle travels.

At S42, the CPU 51 generates a portion of the arc between the start vector and the end vector calculated at the above-described S40, as a first travel path. For example, an example shown in FIG. 16 is an example case in which an arc 95 calculated at the above-described S40 is included in a portion of a lane between a start vector 83 and an end vector 84 in which the vehicle travels (in the travel region obtained at the above-described S31), and the arc 95 is generated as a first travel path. Thereafter, processing transitions to S44.

Figure 17:
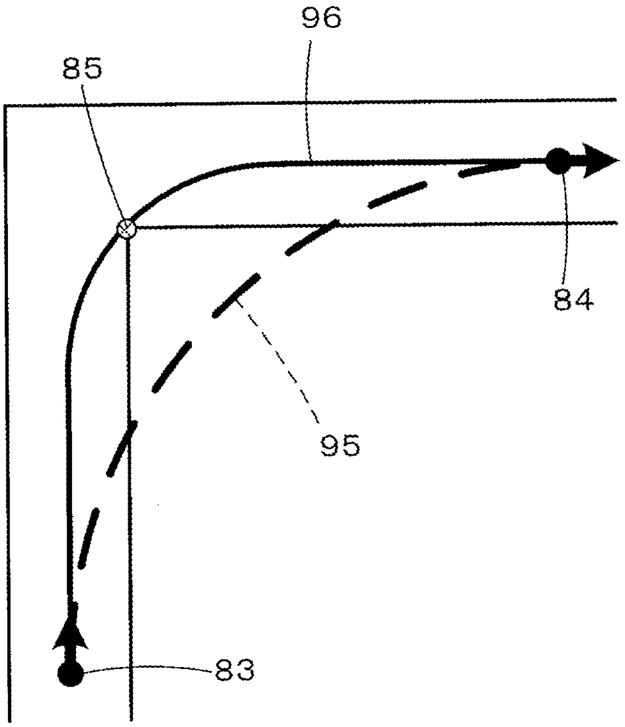
FIG. 17 is a diagram that describes a case in which an arc with the largest radius of curvature that passes through a start vector and an end vector in traveling directions of the respective vectors is not included in a lane in which the vehicle travels.

On the other hand, at S43, since the arc calculated at the above-described S40 is a path that goes out of the travel region and thus cannot be adopted, the CPU 51 generates a new arc that passes through the clipping point 85 set at the above-described S38, and further generates, as a first travel path, a travel path where the new arc is connected to each of the start vector and the end vector which are processing targets such that the travel path goes straight in a traveling direction on a road. For example, an example shown in FIG. 17 is an example case in which an arc 95 calculated at the above-described S40 is not included in a portion of a lane between a start vector 83 and an end vector 84 in which the vehicle travels (in the travel region obtained at the above-described S31), and a path 96 that passes through a clipping point 85 is generated as a first travel path. Note that an arc of the path 96 has a condition that the curvature of the arc is made as small as possible, and the path 96 has a condition that the path 96 does not involve changes in turning direction (the path 96 does not involve a plurality of turning operations).

Figure 18:
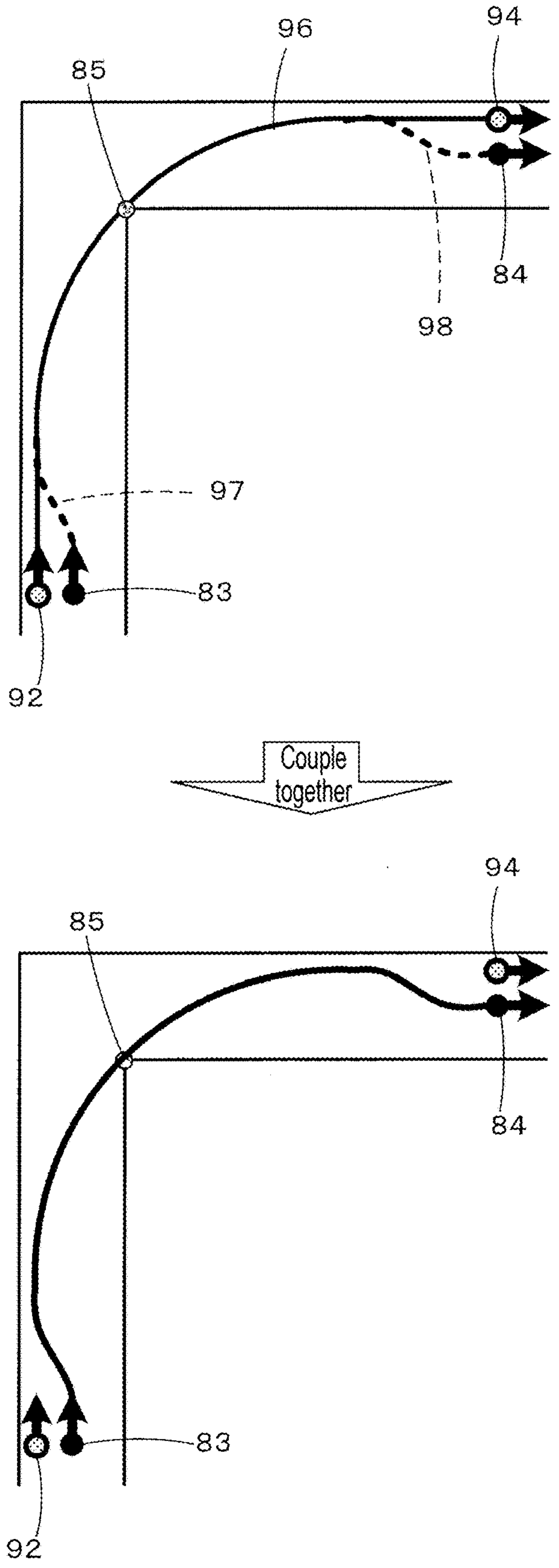
FIG. 18 is a diagram showing a candidate for a travel path generated for a curved section.

Thereafter, at S44, the CPU 51 generates a second travel path for the vehicle to move from the start vector obtained at the above-described S37 to the first travel path generated at the above-described S42 or S43. Note that when, as shown in FIGS. 16 and 17, the start vector which is a processing target is the start vector obtained at the above-described S37, the second travel path is a part of the first travel path, and thus, the process at S44 is not necessary. On the other hand, when, as shown in FIG. 18, the start vector which is a processing target is not the start vector obtained at the above-described S37 (the start vector is a start vector that is newly added at S39), a second travel path is generated. For example, in the example shown in FIG. 18, a first travel path 96 is generated using, as a processing target, a new start vector 92 that is set more to the left than the center of the lane, and a new second travel path 97 for the vehicle to move from the original start vector 83 to the first travel path 96 is generated.

Subsequently, at S45, the CPU 51 generates a third travel path for the vehicle to move from the first travel path generated at the above-described S42 or S43 to the end vector obtained at the above-described S37. Note that when, as shown in FIGS. 16 and 17, the end vector which is a processing target is the end vector obtained at the above-described S37, the third travel path is a part of the first travel path, and thus, the process at S45 is not necessary. On the other hand, when, as shown in FIG. 18, the end vector which is a processing target is not the end vector obtained at the above-described S37 (the end vector is an end vector that is newly added at S39), a third travel path is generated. For example, in the example shown in FIG. 18, the first travel path 96 is generated using, as a processing target, a new end vector 94 that is set more to the left than the center of the lane, and a new third travel path 98 for the vehicle to move from the first travel path 96 to the original end vector 84 is generated.

Figure 19:
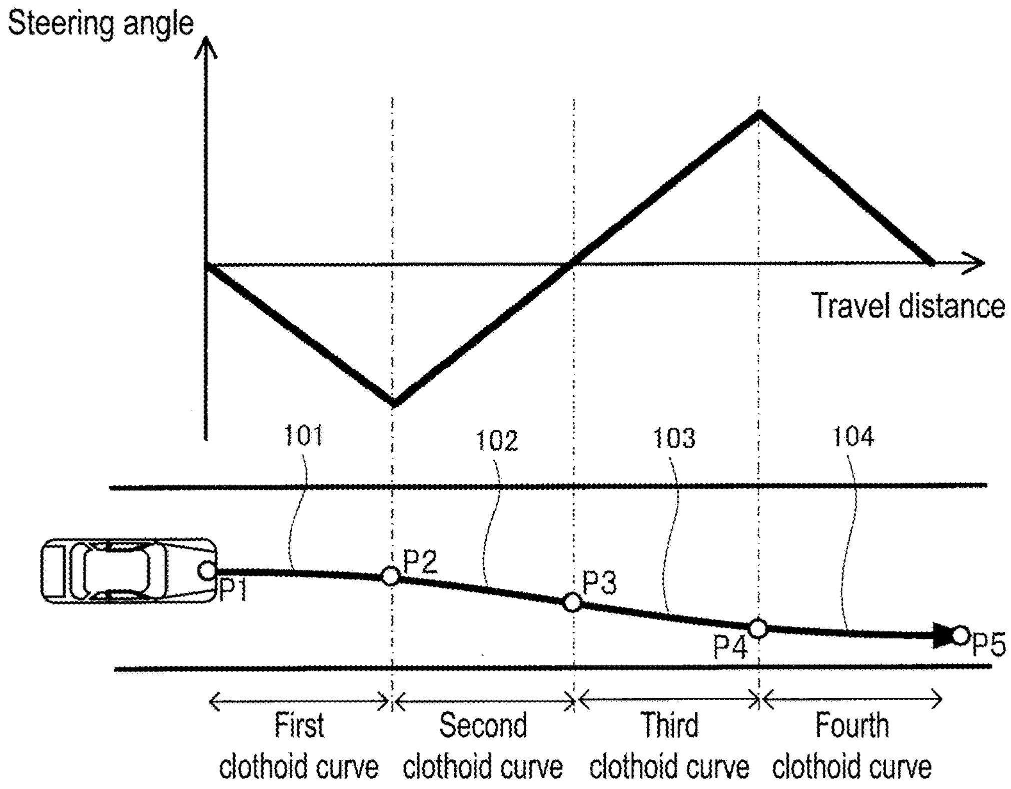
FIG. 19 is a diagram showing a method of generating a second travel path and a third travel path.

Here, a travel path of the vehicle recommended when the vehicle moves to the right or left in the lane like the above-described second travel path or third travel path includes clothoid curves whose curvatures continuously change. More specifically, the travel path is a path obtained by connecting a plurality of clothoid curves having different shapes. FIG. 19 is a diagram showing, for example, a travel path of the vehicle recommended when the vehicle moves to the right in a lane (note that when the vehicle moves to the left, the travel path is a left-right symmetric travel path). As shown in FIG. 19, the travel path of the vehicle recommended when the vehicle moves to the right in a lane includes a first clothoid curve 101 where the vehicle travels from a movement starting point P1 to a first relay point P2 while gradually turning the steering in a rightward direction (i.e., while gradually greatly changing the curvature); a second clothoid curve 102 where the vehicle travels from the first relay point P2 to a midway point P3 while gradually bringing the steering back to a straight-ahead direction (i.e., while gradually mildly changing the curvature); a third clothoid curve 103 where the vehicle travels from the midway point P3 to a second relay point P4 while gradually turning the steering in a leftward direction this time (i.e., while gradually greatly changing the curvature); and a fourth clothoid curve 104 where the vehicle thereafter travels from the second relay point P4 to a movement end point P5 while gradually bringing the steering back to the straight-ahead direction (i.e., while gradually mildly changing the curvature). Note that the width of lateral movement by the clothoid curves 101 to 104 is, for the second travel path, a distance that overlaps the first travel path at the time point of P5, and is, for the third travel path, a distance that overlaps the original end vector 84 at the time point of P5. The CPU 51 calculates the clothoid curves 101 to 104 so as to obtain such a path that acceleration (lateral G) occurring upon movement in the lane does not exceed an upper limit value (e.g., 0.2 G) at which a vehicle's occupant is not given a feeling of discomfort and that, furthermore, the path is as smooth as possible and has the shortest possible distance required for a lane change, using the clothoid curves. Then, by connecting the calculated clothoid curves 101 to 104, the above-described second travel path or third travel path is calculated.

Thereafter, at S46, the CPU 51 couples together the first travel path generated at the above-described S42 or S43, the second travel path generated at the above-described S44 (only when the second travel path is generated), and the third travel path generated at the above-described S45 (only when the third travel path is generated), by which a single travel path is generated. The travel path generated at the above-described S46 is a "candidate for a travel path recommended upon traveling on the curved section" which is generated for a combination of the start vector and the end vector which are processing targets. For example, FIG. 18 shows an example of a "candidate for a travel path recommended upon traveling on the curved section" where the first travel path 96, the second travel path 97, and the third travel path 98 are coupled together.

Thereafter, likewise, for each of a combination of the start vector and the end vector that are obtained at the above-described S37 and combinations of the start vectors and the end vectors that are further newly generated at the above-described S38, a "candidate for a travel path recommended upon traveling on the curved section" is generated, and after generating "candidates for a travel path recommended upon traveling on the curved section" for all combinations of a start vector and an end vector, processing transitions to S47.

Thereafter, at S47, the CPU 51 calculates, for each of the plurality of candidates for a travel path generated at the above-described S46, cost required for vehicle's travel, taking into account vehicle behavior taken when the vehicle travels along the travel path. The cost indicates appropriateness as a travel path. A lower cost indicates higher appropriateness as a travel path. An example of a method of calculating cost at the above-described S47 will be described below.

Specifically, by adding together costs calculated based on the following elements (1) to (3), final cost is calculated for each candidate for a travel path.

(1) Moving time (or distance) . . . Moving time [s]×1.0

(2) Largest curvature . . . Largest curvature×0.1

(3) Number of changes in the turning direction of the steering . . . Number of changes×5.0

First, for (1), a cost is determined by the moving time of the travel path. Specifically, a higher cost is calculated for a longer time required for the vehicle to travel along the travel path, i.e., it can be seen that a travel path with a longer time is less likely to be selected as a recommended travel path. Note that if it is assumed that the vehicle speed of the vehicle upon traveling on a curved section is constant, then the moving time of the travel path also corresponds to the length of the moving distance.

In addition, for (2), the largest curvature of a curve included in the travel path is calculated. Then, a cost is calculated based on the calculated largest curvature. Specifically, the larger the largest curvature of the travel path, a more steep turn is to be performed upon traveling along the travel path, which imposes a great burden on an occupant, resulting in calculating a higher cost, i.e., it can be seen that a travel path with a larger largest curvature is less likely to be selected as a recommended travel path.

In addition, for (3), a cost is determined according to the number of changes in the turning direction of the steering involved in the travel path. Specifically, a higher cost is calculated for a larger number of changes in the turning direction of the steering, i.e., it can be seen that a travel path with a larger number of changes in the turning direction of the steering is less likely to be selected as a recommended travel path.

Note that when cost is calculated for a candidate for a travel path at the above-described S47, the cost may be calculated taking into account only some of the elements in the above-described (1) to (3), instead of taking into account all elements in the above-described (1) to (3). For example, a total value of costs (1) and (2) may be calculated. In addition, cost may be calculated using elements other than the above-described (1) to (3) (e.g., whether or not there is acceleration or deceleration or the amount of turning of the steering).

Thereafter, at S48, the CPU 51 compares the costs calculated at the above-described S47, to select a travel path recommended upon traveling on the curved section from among the plurality of candidates for a travel path generated at the above-described S46. Basically, a candidate for a travel path with the lowest calculated cost is selected as a recommended travel path. Thereafter, processing transitions to S27, and for a section other than the curved section, a travel path recommended upon traveling along the recommended route derived at the above-described S25 is generated.

On the other hand, if it is determined at the above-described S36 that at least two or more curves are consecutively present at spacings within a predetermined distance in the section for which a static travel path ahead in a traveling direction of the vehicle is to be generated (S36: YES), then a travel path recommended upon traveling on a curved section including the detected consecutive curves is generated by the following processes, targeting the curved section. Note that when a plurality of combinations of consecutive curves have been detected, the following processes are performed targeting each of curved sections corresponding to all of the detected curves, by which a travel path is generated. Furthermore, when both consecutive curves and non-consecutive curves have been detected, processes at and after the following S50 are performed in addition to the processes at and after the above-described S37.

Figure 20:
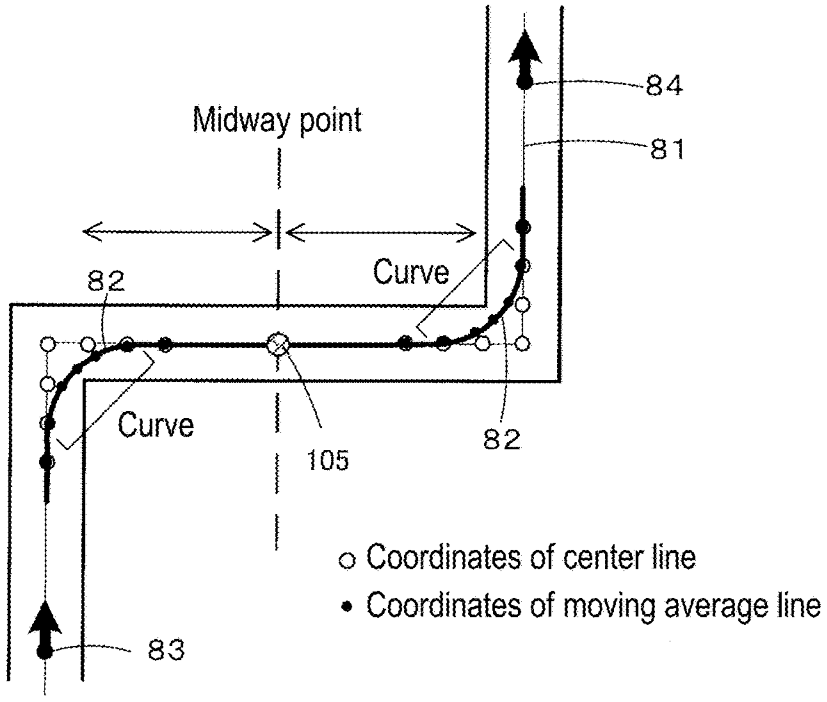
FIG. 20 is a diagram showing a coupling point set for a curved section including a plurality of consecutive curves with different curving directions.
Figure 21:
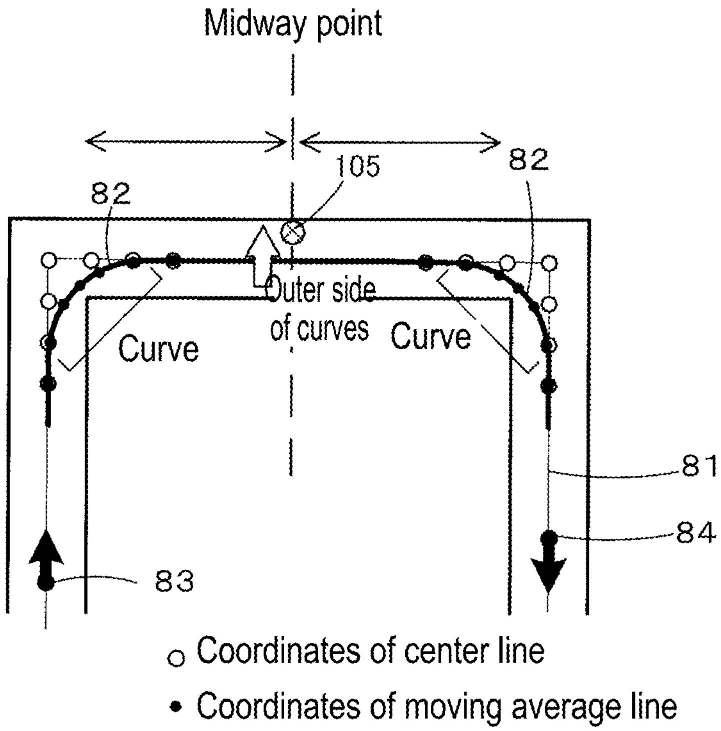
FIG. 21 is a diagram showing a coupling point set for a curved section including a plurality of consecutive curves with identical curving directions.

First, at S50, the CPU 51 separates consecutive curves at a midway point. Specifically, as shown in FIGS. 20 and 21, when two areas where a center line 81 does not coincide with a moving average line 82, i.e., two areas detected as curves at the above-described S34, are present at spacings within a predetermined distance (e.g., 30 in), the curves are separated at a point midway (equal distance) between the areas (hereinafter, referred to as midway point). Note that at the midway point at which the curves are separated, the center line 81 coincides with the moving average line 82 (for a case in which the center line 81 does not coincide with the moving average line 82, it is considered to be a single curve instead of a plurality of consecutive curves). Note also that although FIGS. 20 and 21 show a case in which there are two consecutive curves, for a case in which there are three or more consecutive curves, the curves are separated at their respective midway points.

Then, at S51, the CPU 51 compares the curving directions of the plurality of curves separated at the above-described S50, to determine whether or not the curving directions are identical. Note that FIG. 20 shows a case in which there are consecutive curves with different curving directions, and FIG. 21 shows a case in which there are consecutive curves with identical curving directions.

If it is determined that the curving directions of the plurality of curves separated at the above-described S50 are different from each other (S51: NO), then a coupling point for the plurality of curves is set at a midway point present on a center line of a lane in which the vehicle is planning to travel (S52). Note that the coupling point can be set at any point as long as the point is present within a lane in which the vehicle is planning to travel and at a midway point between the curves that is present on a line segment in a road-width direction, but in the present embodiment, the coupling point is set, particularly, at a point recommended to couple together travel paths of the vehicle that are taken upon traveling around the curves. For example, FIG. 20 shows a case in which there are consecutive curves with different curving directions, and as shown in FIG. 20, a coupling point 105 is set at a midway point (a point at which the curves are separated) and on a center line of a lane in which the vehicle is planning to travel.

On the other hand, if it is determined that the curving directions of the plurality of curves separated at the above-described S50 are identical (S51: YES), then a coupling point for the plurality of curves is set more to the outer side of the curves than a midway point present on a center line of a lane in which the vehicle is planning to travel (S53).

Note that as with S52, the coupling point is set at a point recommended to couple together travel paths of the vehicle that are taken upon traveling around the curves. For example, FIG. 21 shows a case in which there are consecutive curves with identical curving directions, and as shown in FIG. 21, a coupling point 105 is set at a midway point (a point at which the curves are separated) and more to the outer side of the curves than a center line of a lane in which the vehicle is planning to travel. Note that the amount by which the position of the coupling point 105 is shifted toward the outer side of the curves relative to the center line upon setting the coupling point 105 can be set as appropriate, but the amount is, for example, ⅓ or ¼ of lane width.

Subsequently, at S54, the CPU 51 obtains each of a start vector that identifies the position and direction of the vehicle at a starting point of a curved section for a case of traveling along the planned travel route in accordance with the way of moving into lanes selected at the above-described S25, and an end vector that identifies the position and direction of the vehicle at an end point of the curved section.

The positions of the starting point and end point of the curved section may be changed as appropriate according to the way of moving into lanes selected at the above-described S25, or may be set on a fixed condition, regardless of the way of moving into lanes. For example, it is possible to set, as a starting point of a curved section, a point a predetermined distance (e.g., 20 m) before a starting point of a section where a center line 81 and a moving average line 82 for a curve present closest to the vehicle among consecutive curves start to not coincide with each other, and set, as an end point of the curved section, a point a predetermined distance ahead, toward a traveling-direction side, of an end point of a section where a center line 81 and a moving average line 82 for a curve present at the farthest end on the traveling-direction side among the consecutive curves start to not coincide with each other. In addition, when the current location of the vehicle is before the consecutive curves, the current location of the vehicle may serve as a starting point of the curved section. In addition, map information may be configured to include in advance information that identifies curves and curved sections (e.g., information that identifies a link included in a curved section or the coordinates of a starting point and an end point of a curved section), and a curved section may be set based on the map information.

Here, the positions of the start vector and the end vector in a traveling direction on a road (positions in a forward-backward direction) are positions corresponding to the above-described starting point and end point of the curved section.

On the other hand, the positions of the start vector and the end vector in a road-width direction are basically the center of a lane in which the vehicle travels (for a one-lane road or a road with no marked lanes, the positions also correspond to the center of the road). Furthermore, the directions of the start vector and the end vector are basically directions parallel to the traveling direction on the road (road-length direction).

Note, however, that for example, a case in which the vehicle requires a special vehicle operation, such as a lane change or a left or right turn, before a curved section is an exception, and the positions of the start vector and the end vector in the road-width direction may be set more to the left or right than the center of the lane, and the directions may also be set to be inclined relative to the traveling direction on the road.

FIG. 20 is a diagram showing an example of a start vector 83 and an end vector 84 which are set for a curved section including two consecutive curves with different curving directions. In the example shown in FIG. 20, the start vector 83 is set at a point in the center of the lane and a predetermined distance before a starting point of a section where a center line 81 and a moving average line 82 for the first curve start to not coincide with each other, and the end vector 84 is set at a point in the center of the lane and a predetermined distance ahead, toward a traveling-direction side, of an end point of a section where a center line 81 and a moving average line 82 for the second curve start to not coincide with each other. Note that the directions of the start vector 83 and the end vector 84 are directions both parallel to a traveling direction on the road (road-length direction).

In addition, FIG. 21 is a diagram showing an example of a start vector 83 and an end vector 84 which are set for a curved section including two consecutive curves with identical curving directions. In the example shown in FIG. 21, the start vector 83 is set at a point in the center of the lane and a predetermined distance before a starting point of a section where a center line 81 and a moving average line 82 for the first curve start to not coincide with each other, and the end vector 84 is set at a point in the center of the lane and a predetermined distance ahead, toward a traveling-direction side, of an end point of a section where a center line 81 and a moving average line 82 for the second curve start to not coincide with each other. Note that the directions of the start vector 83 and the end vector 84 are directions both parallel to a traveling direction on the road (road-length direction).

Figure 22:
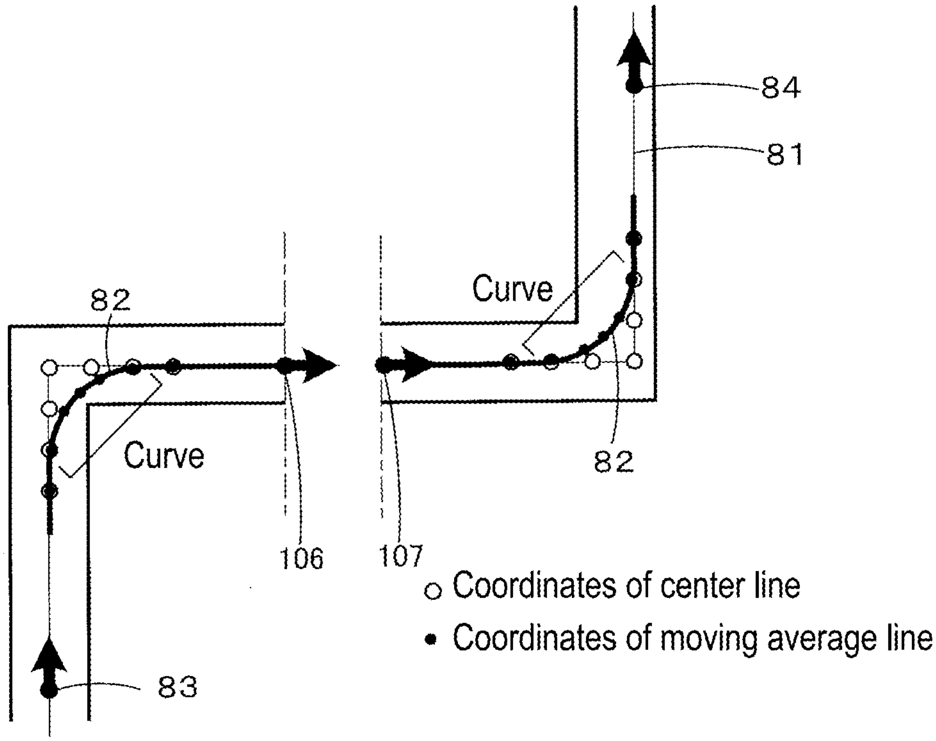
FIG. 22 is a diagram showing a start vector and an end vector set for each section when a curved section including a plurality of consecutive curves with different curving directions is divided at a midway point.
Figure 23:
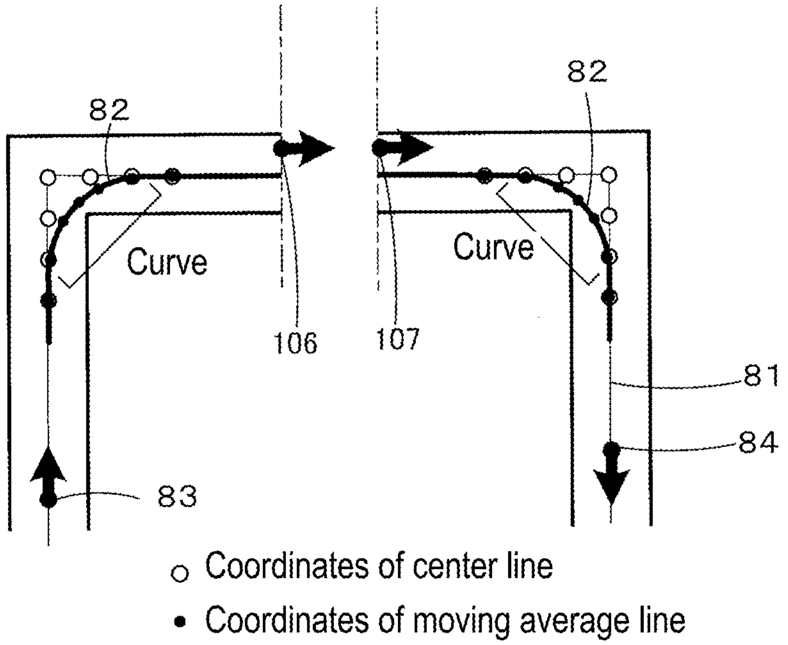
FIG. 23 is a diagram showing a start vector and an end vector set for each section when a curved section including a plurality of consecutive curves with identical curving directions is divided at a midway point.

Thereafter, at S55, the CPU 51 adds a new start vector and a new end vector to the coupling point 105 set at the above-described S52 or S53. As a result, as shown in FIG. 22, for a curved section including two consecutive curves with different curving directions, in a divided first-half curved section, a new end vector 106 is set at the location of the coupling point 105 shown in FIG. 20 (i.e., a midway point in the center of the lane), and in a second-half curved section, a new start vector 107 is set at the location of the coupling point 105 shown in FIG. 20 (i.e., the midway point in the center of the lane). Likewise, as shown in FIG. 23, for a curved section including two consecutive curves with identical curving directions, in a divided first-half curved section, a new end vector 106 is set at the location of the coupling point 105 shown in FIG. 21 (i.e., more to the outer side of the curves than a midway point in the center of the lane), and in a second-half curved section, a new start vector 107 is set at the location of the coupling point 105 shown in FIG. 21 (i.e., more to the outer side of the curves than the midway point in the center of the lane). Note that for easy understanding, FIG. 22 and subsequent diagrams show a state in which a curved section is divided at a midway point into a first-half curved section and a second-half curved section, and the first-half curved section and the second-half curved section are separated from each other. Note that the directions of the new start vector 107 and the new end vector 106 are directions both parallel to a traveling direction on the road (road-length direction).

Subsequently, at S56, the CPU 51 generates, in addition to the start vector obtained at the above-described S54, new candidates for a start vector at a starting point of a curved section for which a travel path is to be generated. Furthermore, the CPU 51 generates, in addition to the end vector obtained at the above-described S54, new candidates for an end vector at an end point of the curved section. Details are the same as those for S39, and a new start vector 91 is generated at a point moved a predetermined distance (e.g., ¼ or ⅙ of lane width) more toward a direction of the outer side of the curve than the original start vector 83, and a new start vector 92 is generated at a point further moved a predetermined distance (e.g., ¼ or ⅙ of lane width) in the direction of the outer side of the curve (see FIG. 15). Likewise, a new end vector 93 is generated at a point moved a predetermined distance (e.g., ¼ or ⅙ of lane width) more toward the direction of the outer side of the curve than the original end vector 84, and a new end vector 94 is generated at a point further moved a predetermined distance (e.g., ¼ or ⅙ of lane width) in the direction of the outer side of the curve.

Figure 24:
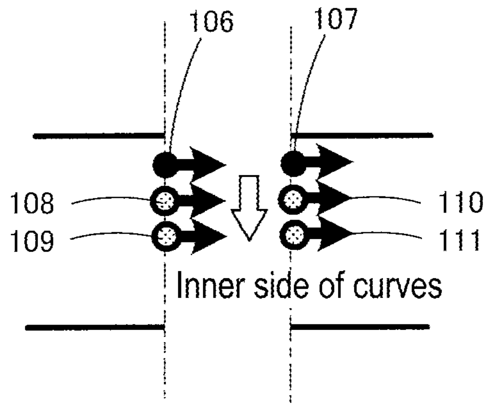
FIG. 24 is a diagram that describes an example of generating a plurality of start vectors and a plurality of end vectors.

In addition, at the above-described S56, for the start vector and the end vector that are added to the coupling point at the above-described S55, too, the CPU 51 likewise generates new candidates for a start vector and an end vector. Note, however, that as shown in FIG. 24, for a curved section including two consecutive curves with identical curving directions, since the end vector 106 and the start vector 107 are already placed more to the outer side of the curves than the center of the lane, new candidates for a start vector and an end vector are generated more toward a direction of the inner side of the curves than the original end vector 106 and the original start vector 107. Specifically, anew end vector 108 is generated at a point moved a predetermined distance (e.g., ¼ or ⅙ of lane width) more toward the direction of the inner side of the curves than the original end vector 106, and a new end vector 109 is generated at a point further moved a predetermined distance (e.g., ¼ or ⅙ of lane width) in the direction of the inner side of the curves. Likewise, a new start vector 110 is generated at a point moved a predetermined distance (e.g., ¼ or ⅙ of lane width) more toward the direction of the inner side of the curves than the original start vector 107, and a new start vector 111 is generated at a point further moved a predetermined distance (e.g., ¼ or ⅙ of lane width) in the direction of the inner side of the curves. Note that although, in the example shown in FIG. 24, two new candidates are generated for each of a start vector and an end vector, only one or three or more candidates may be generated. Note also that it is also possible to generate candidates in a direction of the outer side of the curves. By generating many new candidates for a start vector and an end vector, a more appropriate travel path can be more likely to be generated, but on the other hand, the number of candidates for a travel path increases, and thus, processing load on calculation of travel paths increases.

The following processes from S57 to S63 are performed for each of the curved sections divided at the above-described S50 and for each combination of a start vector and an end vector located at a starting point and an end point of the divided curved section. For example, in the examples shown in FIGS. 22 and 23, a curved section is divided into two curved sections, and a first-half curved section has three start vectors and three end vectors present at a coupling point and a second-half curved section has three start vectors present at the coupling point and three end vectors, and thus, the processes from S57 to S63 are performed for 27 (3×3×3) combinations in total. After performing the processes from S57 to S63 for all divided curved sections and all combinations of a start vector and an end vector, processing transitions to S64.

First, at S57, the CPU 51 calculates an arc with the largest radius of curvature that passes through a start vector and an end vector of a divided curved section which is a processing target in traveling directions of the respective vectors (i.e., the tangential directions of the arc coincide with the traveling directions of the respective vectors).

Thereafter, at S58, the CPU 51 determines whether or not the arc calculated at the above-described S57 is included in a portion of a lane between the start vector and the end vector in which the vehicle travels (in the travel region obtained at the above-described S31).

If it is determined that the arc calculated at the above-described S57 is included in a portion of a lane between the start vector and the end vector in which the vehicle travels (in the travel region obtained at the above-described S31) (S58: YES), then processing transitions to S59. On the other hand, if it is determined that the arc calculated at the above-described S57 is not included in a portion of a lane between the start vector and the end vector in which the vehicle travels (in the travel region obtained at the above-described S31) (S58: NO), then processing transitions to S60.

At S59, the CPU 51 generates a portion of the arc between the start vector and the end vector calculated at the above-described S57, as a first travel path. Details are the same as those for the above-described S42 (FIG. 16) and thus are omitted. Thereafter, processing transitions to S61.

On the other hand, at S60, since the arc calculated at the above-described S57 is a path that goes out of the travel region and thus cannot be adopted, the CPU 51 generates a new arc that passes through a clipping point, and further generates, as a first travel path, a travel path where the new arc is connected to each of the start vector and the end vector which are processing targets such that the travel path goes straight in a traveling direction on a road. Details are the same as those for the above-described S43 (FIG. 17) and thus are omitted. Note that a method of setting a clipping point is the same as that at S38. Thereafter, processing transitions to S61.

At S61, the CPU 51 generates a second travel path for the vehicle to move from the start vector obtained at the above-described S54 or S55 to the first travel path generated at the above-described S59 or S60. Note that when the start vector which is a processing target is the start vector obtained at the above-described S54 or S55, the second travel path is a part of the first travel path, and thus, the process at S61 is not necessary. Details are the same as those for the above-described S44 (FIG. 18) and thus are omitted.

Subsequently, at S62, the CPU 51 generates a third travel path for the vehicle to move from the first travel path generated at the above-described S59 or S60 to the end vector obtained at the above-described S54 or S55. Note that when the end vector which is a processing target is the end vector obtained at the above-described S54 or S55, the third travel path is a part of the first travel path, and thus, the process at S62 is not necessary. Details are the same as those for the above-described S45 (FIG. 18) and thus are omitted.

Thereafter, at S63, the CPU 51 couples together the first travel path generated at the above-described S59 or S60, the second travel path generated at the above-described S61 (only when the second travel path is generated), and the third travel path generated at the above-described S62 (only when the third travel path is generated), by which a single travel path is generated. The travel path generated at the above-described S63 is a "candidate for a travel path recommended upon traveling on the divided curved section" which is generated for a combination of a start vector and an end vector of the divided curved section which is a processing target.

Thereafter, likewise, for each of the curved sections divided at the above-described S50 and for each combination of a start vector and an end vector located at a starting point and an end point of the divided curved section, a "candidate for a travel path recommended upon traveling on the divided curved section" is generated, and after generating "candidates for a travel path recommended upon traveling on the divided curved section" for all divided curved sections and all combinations of a start vector and an end vector, processing transitions to S64.

At S64, the CPU 51 couples together, for all possible combination patterns, a candidate for a travel path recommended upon traveling on a first-half curved section that reaches a coupling point from a starting point of a curved section (hereinafter, referred to as candidate for a first-half travel path) and a candidate for a travel path recommended upon traveling on a second-half curved section that reaches an end point of the curved section from the coupling point (hereinafter, referred to as candidate for a second-half travel path) among the "candidates for a travel path recommended upon traveling on the divided curved section" which are generated at the above-described S63, by which "candidates for a travel path recommended upon traveling on a curved section including consecutive curves" are generated. Note, however, that candidates for travel paths to be coupled together are a combination of a candidate for a first-half travel path and a candidate for a second-half travel path, the candidate for a first-half travel path having an end vector that coincides with a start vector of the candidate for a second-half travel path, i.e., a combination of candidates for paths that are connected at a coupling point. For example, when a curved section is divided into two curved sections, and a first-half curved section has three start vectors and three end vectors present at a coupling point and a second-half curved section has three start vectors present at the coupling point and three end vectors, there are 27 (3×3×3) combinations in total, resulting in generating 27 "candidates for a travel path recommended upon traveling on the curved section including consecutive curves" in total. Note that the same also applies to a case in which a curved section is divided into three or more curved sections, and candidates for travel paths recommended for the respective curved sections are combined and coupled together at coupling points.

Figure 25:
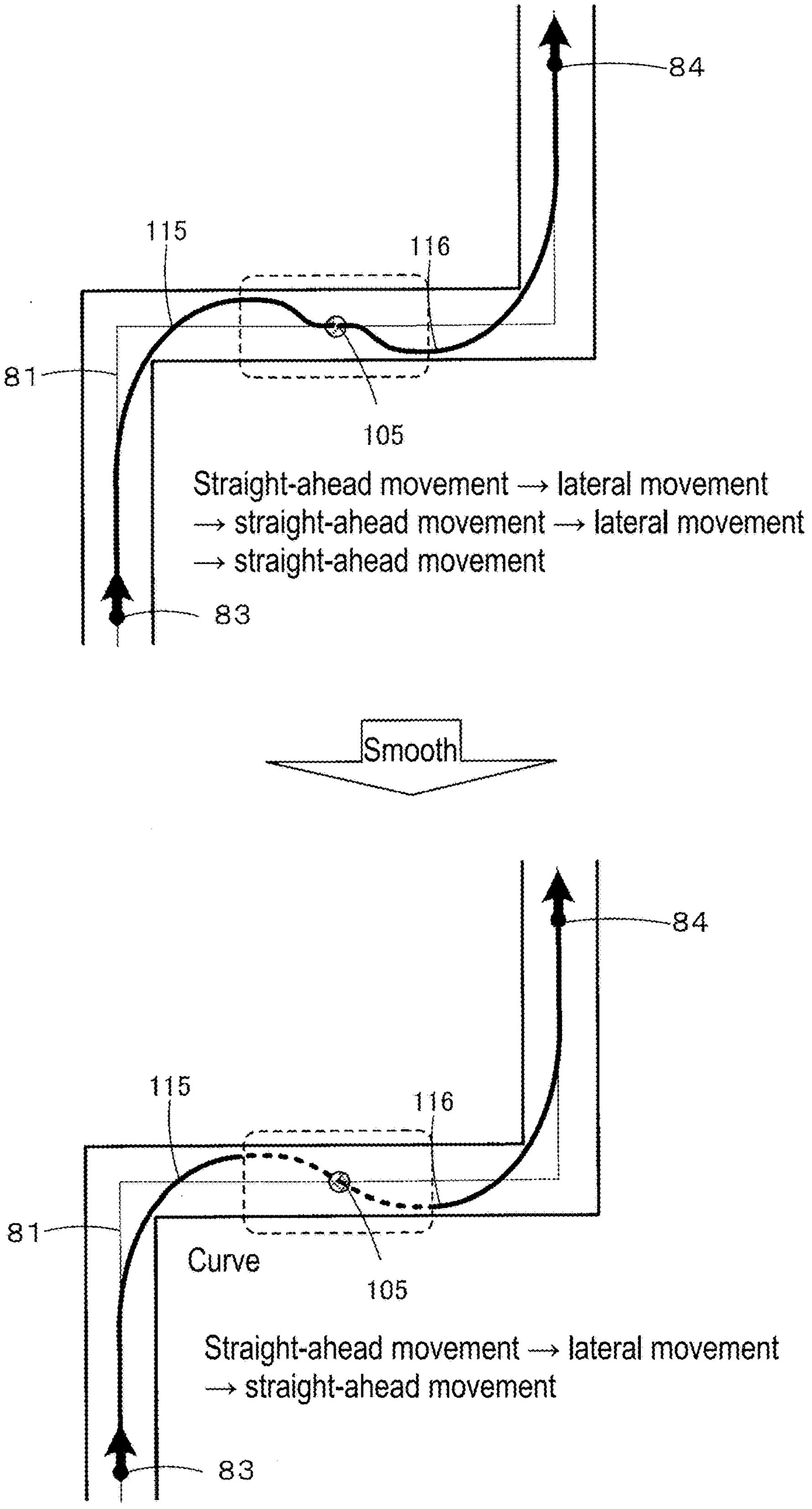
FIG. 25 is a diagram showing exemplary correction for smoothing a travel path.

Furthermore, at the above-described S64, before comparing costs at S65 and S66 which will be described later, when it is possible to smooth a generated "candidate for a travel path recommended upon traveling on a curved section including consecutive curves", the CPU 51 smooths the travel path. Specifically, as shown in FIG. 25, particularly, in a case of a plurality of consecutive curves with different curving directions, when, as a result of combining together a candidate for a first-half travel path 115 and a candidate for a second-half travel path 116, a travel path is generated where lateral movement and straight-ahead movement are repeated near a coupling point 105 at which the candidates for paths are coupled together, the travel path is smoothed by, particularly, modifying the travel path so as not to include, around the coupling point 105, a section where the vehicle travels straight ahead along a center line 81 of a lane. Namely, a path including "straight-ahead movement→lateral movement→straight-ahead movement→lateral movement→straight-ahead movement" for an area enclosed by a broken line in FIG. 25 is modified to a path including "straight-ahead movement→lateral movement→straight-ahead movement" by removing the "straight-ahead movement" portion at the center and connecting the "straight-ahead movement" portions at both ends by clothoid curves shown in FIG. 18 that make lateral movement. As a result, the travel path can be modified to one with a reduced largest curvature and a reduced number of changes in the turning direction of the steering.

Thereafter, at S65, the CPU 51 calculates, for each of the plurality of candidates for a travel path generated and modified as necessary at the above-described S64, cost required for vehicle's travel, taking into account vehicle behavior taken when the vehicle travels along the travel path. The cost indicates appropriateness as a travel path. A lower cost indicates higher appropriateness as a travel path. Details are the same as those for the above-described S47, and by adding together costs calculated based on the elements (1) to (3), final cost is calculated for each candidate for a travel path.

Thereafter, at S66, the CPU 51 compares the costs calculated at the above-described S65, to select a travel path recommended upon traveling on the curved section including consecutive curves from among the plurality of candidates for a travel path generated at the above-described S64. Basically, a candidate for a travel path with the lowest calculated cost is selected as a recommended travel path. Thereafter, processing transitions to S27, and for a section other than the curved section, a travel path recommended upon traveling along the recommended route derived at the above-described S25 is generated.

As described in detail above, in the navigation device 1 and a computer program executed by the navigation device 1 according to the present embodiment, a planned travel route along which a vehicle travels is obtained (S1); particularly, when the obtained planned travel route includes a plurality of consecutive curves, a coupling point for the plurality of curves is set, targeting a curved section including the plurality of curves (S52 and S53); each of a start vector that identifies the position and direction of the vehicle at a starting point of the curved section for a case of traveling along the planned travel route and an end vector that identifies the position and direction of the vehicle at an end point of the curved section is obtained (S54); a first-half travel path that reaches the coupling point from the start vector and a second-half travel path that reaches the end vector from the coupling point are combined together, targeting the curved section, by which a travel path recommended for the vehicle to travel along is generated (S57 to S66); and driving assistance for the vehicle is provided based on the generated travel path (S9 and S10). Thus, it becomes possible to generate a travel path that suppresses a steep turn or sudden deceleration upon traveling on a curved section including a plurality of consecutive curves, as a travel path recommended for the vehicle to travel along. As a result, it becomes possible to provide appropriate driving assistance that does not impose a burden on a vehicle's occupant.

In addition, using map information including information about markings and targeting the curved section including the plurality of curves, a point recommended to couple together travel paths of the vehicle that are taken upon traveling around the respective curves is set between the plurality of curves, as the coupling point. Thus, it becomes possible to generate, based on map information, a travel path that suppresses a steep turn or sudden deceleration upon traveling on a curved section including a plurality of consecutive curves, as a travel path recommended for the vehicle to travel along.

In addition, the coupling point is set based on curving directions of the plurality of curves. Thus, it becomes possible to set a coupling point at an appropriate location, based on curving directions of consecutive curves.

In addition, when the curving directions of the plurality of curves are identical, the coupling point is set more to the outer side of the curves than a center line of a lane in which the vehicle is planning to travel (S53). Thus, it becomes possible to set a coupling point at an appropriate location for a curved section including a plurality of consecutive curves with identical curving directions.

In addition, when the curving directions of the plurality of curves are different from each other, the coupling point is set on a center line of a lane in which the vehicle is planning to travel (S52). Thus, it becomes possible to set a coupling point at an appropriate location for a curved section including a plurality of consecutive curves with different curving directions.

In addition, costs are calculated for combinations of a plurality of candidates for a first-half travel path and a plurality of candidates for a second-half travel path (S65), and the calculated costs are compared to select and generate a combination of travel paths recommended for the vehicle to travel along from among the combinations of a plurality of candidates for a first-half travel path and a plurality of candidates for a second-half travel path (S66). Thus, it becomes possible to appropriately select one travel path that is recommended most for the vehicle to travel along from among combinations of multiple candidates for travel paths by calculating and comparing costs.

In addition, for the combinations of a plurality of candidates for a first-half travel path and a plurality of candidates for a second-half travel path, a lower cost is calculated for a travel path with a smaller curvature or for a travel path with a shorter moving time (S65). Thus, it becomes possible to select, as the most recommended travel path for the vehicle to travel along, a combination of candidates for travel paths with a small burden on vehicle's travel, taking into account vehicle behavior taken when the vehicle travels.

In addition, when the curving directions of the plurality of curves are different from each other, a travel path obtained by combining together the first-half travel path and the second-half travel path is modified so as not to include, around the coupling point, a section where the vehicle travels straight ahead along the center line of the lane (S64). Thus, it becomes possible to modify a travel path to a more recommended travel path with a reduced largest curvature and a reduced number of changes in the turning direction of the steering.

Note that the present disclosure is not limited to the above-described embodiment, and it is, of course, possible to make various modifications and alterations thereto without departing from the spirit and scope of the present disclosure.

For example, in the present embodiment, as shown in FIGS. 12 and 13, a recommended travel path is generated targeting a road with no junctions or no increase or decrease in the number of lanes and with a curve that curves at a predetermined curvature in an arc-shaped manner or a curve that curves at a predetermined angle, but there may be a junction or an increase or decrease in the number of lanes at some midpoint as long as the curve is one through which the vehicle passes, traveling in the same lane on a road. In addition, for a road with no marked lanes (with no markings), the entire road is considered to be a lane in which the vehicle travels, by which it is possible to generate a travel path likewise.

In addition, in the present embodiment, a center line 81 and a moving average line 82 are identified based on map information, and the presence of a curve is identified by comparing the center line 81 with the moving average line 82 (S34), but for example, by performing an image recognition process on an image captured with an exterior camera, the presence of a curve may be identified. Furthermore, for a coupling point 105 set in a curved section including a plurality of consecutive curves, too, it is also possible to identify a midway point between the plurality of curves, using an image captured with the above-described exterior camera instead of using map information, and set the coupling point 105 at the midway point.

In addition, in the present embodiment, the center line 81 is a center line of a lane in which the vehicle travels, but for a one-lane road or a road with no marked lanes, the center line 81 may be a center line of the road.

In addition, in the present embodiment, upon generating a travel path for a curved section including a plurality of consecutive curves, the curved section is divided at a midway point between the curves (S50), but the curved section does not necessary need to be divided at the midway point as long as the curved section is divided at some point between the curves. It is also possible to change a location at which the curved section is divided, depending on the shape of each curve.

In addition, in the present embodiment, travel paths for a curved section are generated using a plurality of patterns that can be taken by the vehicle, and a travel path to be finally recommended is determined by comparing costs of the generated travel paths, but a travel path for a curved section may be generated using only one pattern that is recommended most as a result of taking into account in advance the geometry of a lane in which the vehicle travels, etc.

In addition, in the present embodiment, after generating a travel path, vehicle control for traveling along the generated travel path is performed (S9 and S10), but it is also possible to omit processes related to vehicle control at and after S9. For example, the navigation device 1 may be a device that provides the user with guidance on a recommended travel path, without performing vehicle control based on the travel path.

In addition, in the present embodiment, a lane network and an intra-parking-lot network are generated using high-precision map information 16 and facility information 17 (S23), but networks that target roads and parking lots across the country may be stored in advance in a DB, and the networks may be read from the DB as necessary.

In addition, in the present embodiment, high-precision map information provided in the server device 4 includes both information about the lane geometries of roads (lane-by-lane road geometries, curvatures, lane widths, etc.) and information about markings (centerlines, lane lines, edge lines, guidelines, etc.) painted on the roads, but may include only the information about markings or may include only the information about the lane geometries of roads. For example, even when only the information about markings is included, it is possible to estimate information corresponding to the information about the lane geometries of roads, based on the information about markings. In addition, even when only the information about the lane geometries of roads is included, it is possible to estimate information corresponding to the information about markings, based on the information about the lane geometries of roads. In addition, the "information about markings" may be information that identifies the types and layout of markings themselves that mark off lanes, or may be information that identifies whether or not a lane change can be made between adjacent lanes, or may be information that directly or indirectly identifies the geometries of lanes.

In addition, in the present embodiment, as means for reflecting a dynamic travel path in a static travel path, a part of the static travel path is replaced by the dynamic travel path (S7), but instead of replacement, the static travel path may be modified to approximate to the dynamic travel path.

In addition, in the present embodiment, controlling, by the vehicle control ECU 40, of all of an accelerator operation, a brake operation, and a steering wheel operation which are operations related to vehicle behavior among vehicle's operations is described as autonomous driving assistance for performing autonomous travel independently of user's driving operations. However, the autonomous driving assistance may refer to controlling, by the vehicle control ECU 40, of at least one of an accelerator operation, a brake operation, and a steering wheel operation which are operations related to vehicle behavior among vehicle's operations. On the other hand, manual driving by user's driving operations is described as the user performing all of an accelerator operation, a brake operation, and a steering wheel operation which are operations related to vehicle behavior among vehicle's operations.

In addition, driving assistance of the present disclosure is not limited to autonomous driving assistance related to vehicle's autonomous driving. For example, it is also possible to provide driving assistance by displaying a static travel path generated at the above-described S3 or a dynamic travel path generated at the above-described S6 on a navigation screen and providing guidance using voice, a screen, etc. (e.g., guidance on a lane change or guidance on a recommended vehicle speed). In addition, user's driving operations may be assisted by displaying a static travel path or a dynamic travel path on a navigation screen.

In addition, in the present embodiment, a configuration is adopted in which the autonomous driving assistance program (FIG. 4) is executed by the navigation device 1, but a configuration may be adopted in which the autonomous driving assistance program is executed by an in-vehicle device other than the navigation device 1 or by the vehicle control ECU 40. In that case, a configuration is adopted in which the in-vehicle device or the vehicle control ECU 40 obtains a current location of the vehicle, map information, etc., from the navigation device 1 or the server device 4. Furthermore, the server device 4 may perform some or all of the steps of the autonomous driving assistance program (FIG. 4). In that case, the server device 4 corresponds to a driving assistance device of the present application.

In addition, aspects of the present disclosure can also be applied to mobile phones, smartphones, tablet terminals, personal computers, etc. (hereinafter, referred to as portable terminals, etc.) in addition to navigation devices. In addition, it becomes also possible to apply the aspects of the present disclosure to a system including a server and a portable terminal, etc. In that case, a configuration may be adopted in which each step of the above-described autonomous driving assistance program (see FIG. 4) is performed by either one of the server and the portable terminal, etc. Note, however, that when the present disclosure is applied to a portable terminal, etc., a vehicle that can provide autonomous driving assistance needs to be connected to the portable terminal, etc., such that they can communicate with each other (it does not matter whether they are connected by wire or wirelessly).

REFERENCE SIGNS LIST

1: Navigation device (Driving assistance device), 2: Driving assistance system, 3: Information delivery center, 4: Server device, 5: Vehicle, 16: High-precision map information, 33: Navigation ECU, 40: Vehicle control ECU, 51: CPU, 81: Center line, 82: Moving average line, 83: Start vector, 84: End vector, 85: Clipping point (Passing point), 96: First travel path, 97: Second travel path, 98: Third travel path, 105: Coupling point, 115: Candidate for a first-half travel path, and 116: Candidate for a second-half travel path.

The invention claimed is:

1. A driving assistance device comprising:

planned travel route obtaining means for obtaining a planned travel route along which a vehicle travels;

coupling-point setting means for setting, when the planned travel route includes a plurality of consecutive curves, a coupling point for the plurality of curves, targeting a curved section including the plurality of curves;

start-vector obtaining means for obtaining a start vector that identifies a position and a direction of a vehicle at a starting point of the curved section for a case of traveling along the planned travel route;

end-vector obtaining means for obtaining an end vector that identifies a position and a direction of a vehicle at an end point of the curved section for a case of traveling along the planned travel route;

travel path generating means for generating a travel path recommended for a vehicle to travel along, by combining together a first-half travel path and a second-half travel path, targeting the curved section, the first-half travel path reaching the coupling point from the start vector, and the second-half travel path reaching the end vector from the coupling point; and driving assistance means for providing driving assistance for a vehicle, based on the travel path generated by the travel path generating means, wherein the coupling-point setting means sets, as the coupling point, a point between the plurality of curves, using map information including information about markings and targeting a curved section including the plurality of curves, the point being recommended to couple together travel paths of a vehicle that are taken upon traveling around the respective curves, and the coupling-point setting means sets the coupling point, based on curving directions of the plurality of curves.

2. The driving assistance device according to claim 1, wherein when the curving directions of the plurality of curves are identical, the coupling-point setting means sets the coupling point more to an outer side of curves than a center line of a lane in which a vehicle is planning to travel.

3. The driving assistance device according to claim 1, wherein when the curving directions of the plurality of curves are different from each other, the coupling-point setting means sets the coupling point on a center line of a lane in which a vehicle is planning to travel.

4. The driving assistance device according to claim 3, comprising: travel path modifying means for modifying, when the curving directions of the plurality of curves are different from each other, a travel path so as not to include, around the coupling point, a section where the vehicle travels straight ahead along a center line of a lane, the travel path being obtained by combining together the first-half travel path and the second-half travel path.

5. The driving assistance device according to claim 1, wherein the travel path generating means calculates costs for combinations of a plurality of candidates for a first-half travel path and a plurality of candidates for a second-half travel path; and compares calculated costs to select and generate a combination of travel paths recommended for a vehicle to travel along from among combinations of a plurality of candidates for a first-half travel path and a plurality of candidates for a second-half travel path.

6. The driving assistance device according to claim 5, wherein for combinations of a plurality of candidates for a first-half travel path and a plurality of candidates for a second-half travel path, the travel path generating means calculates a lower cost for a combination of travel paths with a smaller curvature or for a combination of travel paths with a shorter moving time.

7. A computer program stored on a non-transitory computer readable medium configured to cause a computer to function as:

planned travel route obtaining means for obtaining a planned travel route along which a vehicle travels;

coupling-point setting means for setting, when the planned travel route includes a plurality of consecutive curves, a coupling point for the plurality of curves, targeting a curved section including the plurality of curves;

start-vector obtaining means for obtaining a start vector that identifies a position and a direction of a vehicle at a starting point of the curved section for a case of traveling along the planned travel route;

end-vector obtaining means for obtaining an end vector that identifies a position and a direction of a vehicle at an end point of the curved section for a case of traveling along the planned travel route;

travel path generating means for generating a travel path recommended for a vehicle to travel along, by combining together a first-half travel path and a second-half travel path, targeting the curved section, the first-half travel path reaching the coupling point from the start vector, and the second-half travel path reaching the end vector from the coupling point; and driving assistance means for providing driving assistance for a vehicle, based on the travel path generated by the travel path generating means, wherein the coupling-point setting means sets, as the coupling point, a point between the plurality of curves, using map information including information about markings and targeting a curved section including the plurality of curves, the point being recommended to couple together travel paths of a vehicle that are taken upon traveling around the respective curves, and the coupling-point setting means sets the coupling point, based on curving directions of the plurality of curves.

* * * * *